(12) United States Patent
Castricum

(10) Patent No.: US 8,578,577 B2
(45) Date of Patent: *Nov. 12, 2013

(54) MACHINE TO PRODUCE EXPANDED METAL SPIRALLY LOCK-SEAMED TUBING FROM SOLID COIL STOCK

(75) Inventor: Wilhelmus P. H. Castricum, Ormond Beach, FL (US)

(73) Assignee: Helix International, Inc., Elk Grove Village, IL (US)

( * ) Notice: Subject to any disclaimer, the term of this patent is extended or adjusted under 35 U.S.C. 154(b) by 1349 days.

This patent is subject to a terminal disclaimer.

(21) Appl. No.: 12/288,293

(22) Filed: Oct. 17, 2008

(65) Prior Publication Data

US 2009/0235506 A1  Sep. 24, 2009

Related U.S. Application Data

(63) Continuation-in-part of application No. 12/049,769, filed on Mar. 17, 2008, which is a continuation-in-part of application No. PCT/US2006/035083, filed on Sep. 8, 2006.

(60) Provisional application No. 60/718,974, filed on Sep. 20, 2005.

(51) Int. Cl.
  *B21B 31/04* (2006.01)
  *B21D 47/04* (2006.01)

(52) U.S. Cl.
  USPC .............................. 29/33 Q; 29/33 S; 29/6.2

(58) Field of Classification Search
  USPC .................................. 29/6.1, 6.2, 33 Q, 33 S
  See application file for complete search history.

(56) References Cited

U.S. PATENT DOCUMENTS

| | | | | |
|---|---|---|---|---|
| 1,195,222 A | * | 8/1916 | Herr | 29/6.1 |
| 1,195,223 A | * | 8/1916 | Herr | 29/6.1 |
| 1,472,769 A | | 10/1923 | Naugle et al. | |
| 1,510,704 A | * | 10/1924 | Rendleman | 72/177 |
| 1,746,520 A | * | 2/1930 | Brody | 29/6.1 |

(Continued)

FOREIGN PATENT DOCUMENTS

| | | |
|---|---|---|
| EP | 1 023 131 | 9/2002 |
| WO | WO 01/44742 | 6/2001 |

OTHER PUBLICATIONS

International Search Report priority PCT Application No. PCT/US2006/35083, dated Apr. 20, 2007.

(Continued)

*Primary Examiner* — David Bryant
*Assistant Examiner* — Jason L Vaughan
(74) *Attorney, Agent, or Firm* — Brinks Gilson & Lione

(57) ABSTRACT

An apparatus for expanding metal and forming tubing combines two metal-forming operations into a single process. Tubing, such as that used for filters, is desirably expanded so that air or liquid may pass thru "diamonds" formed in the tubing. Expanding metal and forming tubing is accomplished in a single, continuous process by first slitting and expanding the metal, and then locking its seams to form a spiral pipe. This avoids depending on vendors for delivery of expanded metal at fluctuating prices, eliminates intermediate steps of handling the coils, and eliminates rusting while the expanded steel coils await formation into tubing. Tubing made from expanded metal may be used for air filters, oil filters, water filters, separators and other types of filters. Double-wall HVAC ducting systems or silencers can also use expanded material for reducing heat transfer and noise.

8 Claims, 27 Drawing Sheets

(56) References Cited

U.S. PATENT DOCUMENTS

| | | | |
|---|---|---|---|
| 1,747,138 A * | 2/1930 | Kessler | 29/6.1 |
| 1,856,686 A * | 5/1932 | Baker | 29/6.1 |
| 2,104,249 A * | 1/1938 | Vass | 29/6.2 |
| 3,183,695 A | 5/1965 | Darner | |
| 3,276,096 A * | 10/1966 | McAleer et al. | 29/6.1 |
| 3,753,367 A | 8/1973 | Trihey | |
| 4,144,624 A | 3/1979 | Szego et al. | |
| 4,247,970 A | 2/1981 | Bollinger | |
| 4,291,443 A * | 9/1981 | Laurie et al. | 29/6.1 |
| 4,305,187 A | 12/1981 | Iwamura et al. | |
| 4,315,356 A | 2/1982 | Laurie et al. | |
| 4,486,927 A * | 12/1984 | Hunter et al. | 29/6.1 |
| 4,649,607 A | 3/1987 | Kuhn, II | |
| 5,088,170 A | 2/1992 | Spath | |
| 5,093,971 A | 3/1992 | Hein | |
| 5,095,597 A | 3/1992 | Alhamad et al. | |
| 5,136,765 A | 8/1992 | Tanaka et al. | |
| 5,199,142 A | 4/1993 | Davis | |
| 5,239,735 A | 8/1993 | Tanaka et al. | |
| 5,302,466 A | 4/1994 | Davis et al. | |
| 5,524,410 A | 6/1996 | Menchetti | |
| 5,661,881 A | 9/1997 | Menchetti | |
| 5,778,626 A | 7/1998 | Hellsten | |
| 6,156,444 A | 12/2000 | Smith et al. | |
| 6,202,271 B1 | 3/2001 | Goda et al. | |
| 6,212,744 B1 * | 4/2001 | Inanobe et al. | 29/6.1 |
| 6,526,637 B1 | 3/2003 | Geissler | |
| 6,629,016 B1 | 9/2003 | Smith | |
| 6,691,386 B2 | 2/2004 | Marlow | |
| 6,696,169 B1 | 2/2004 | Rottger et al. | |
| 2002/0139160 A1 | 10/2002 | Price et al. | |
| 2003/0187539 A1 | 10/2003 | Smith | |
| 2003/0230127 A1 | 12/2003 | Castricum | |
| 2004/0093704 A1 | 5/2004 | Marlow | |
| 2008/0222869 A1 | 9/2008 | Castricum | |

OTHER PUBLICATIONS

International Preliminary Report on Patentability mailed Apr. 3, 2008, corresponding PCT application PCT/US2006/035083.

* cited by examiner

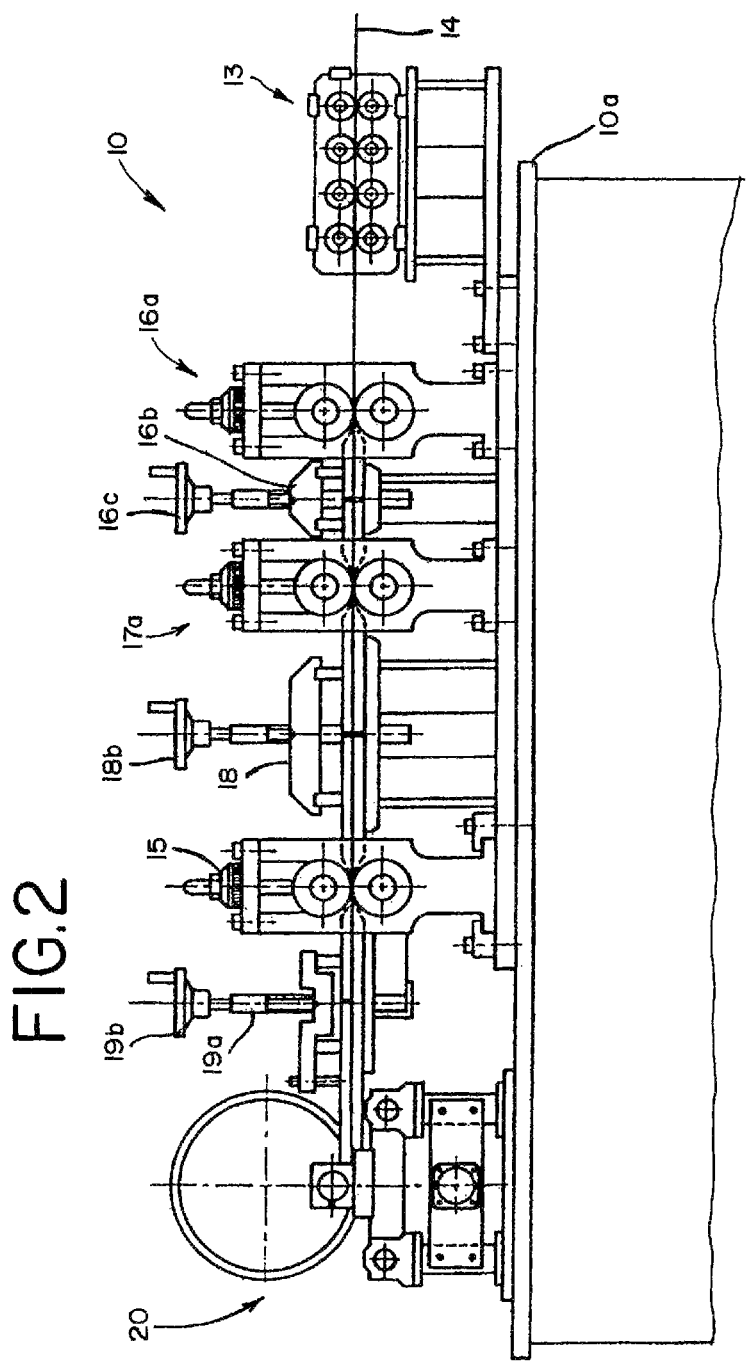

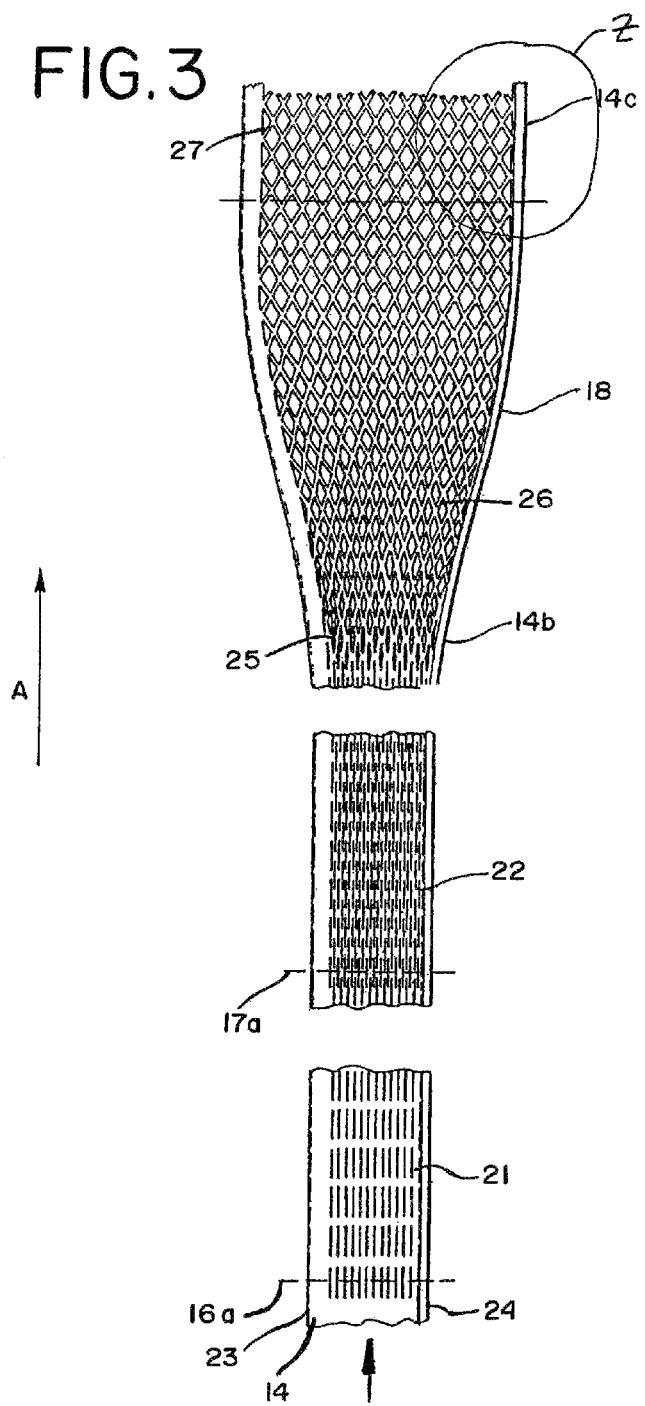

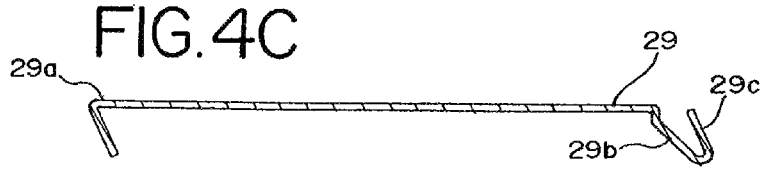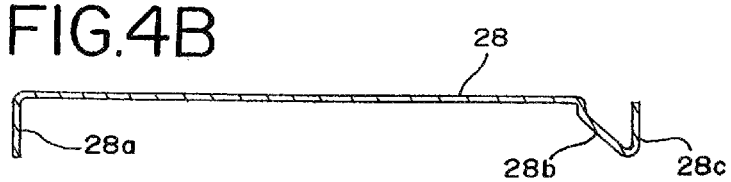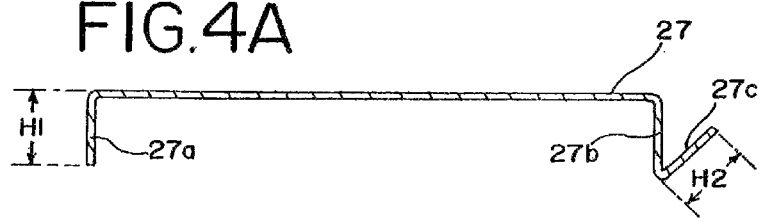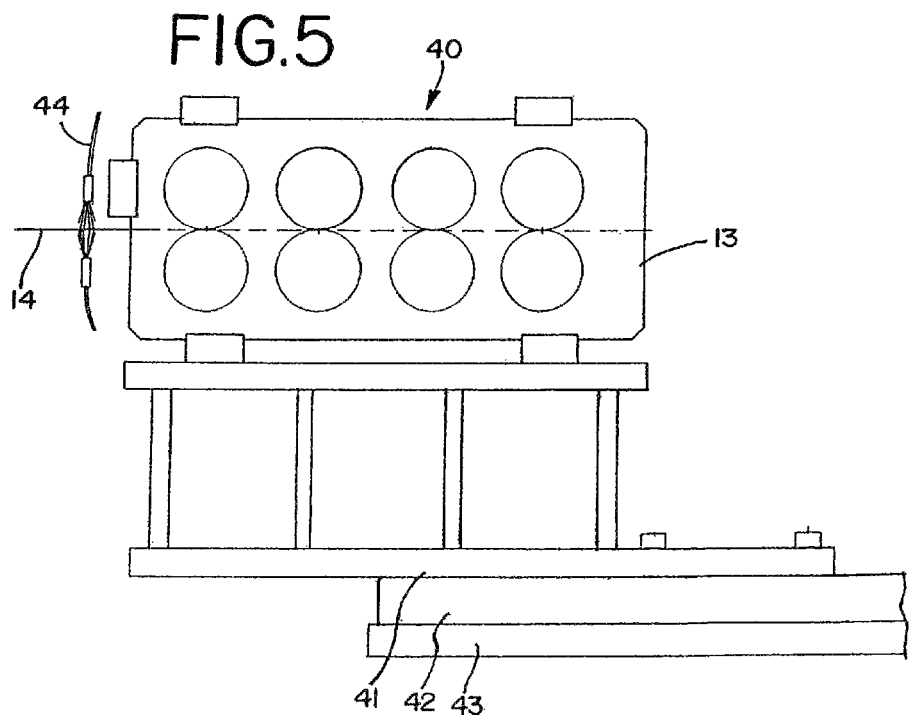

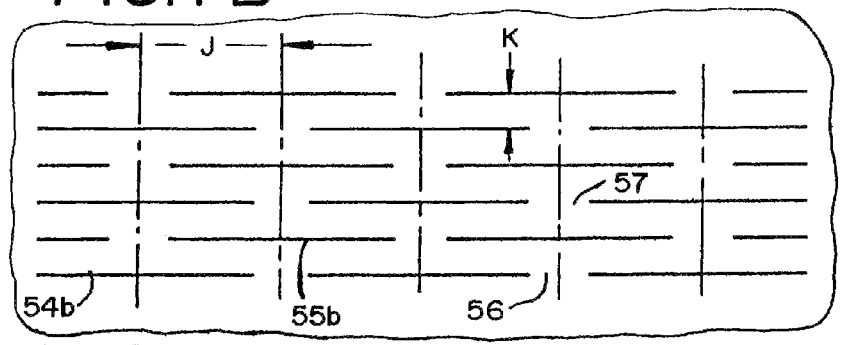
FIG. 7B
FIG. 7A
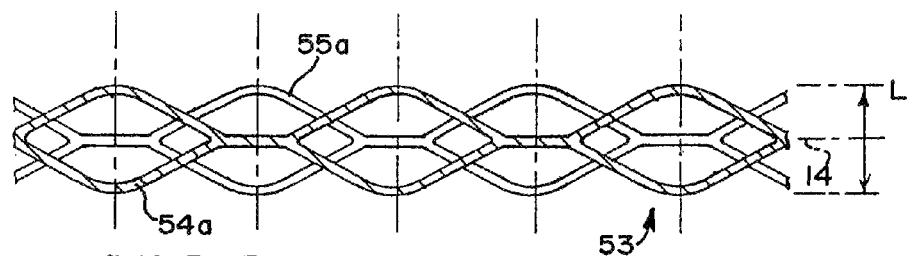
FIG. 8
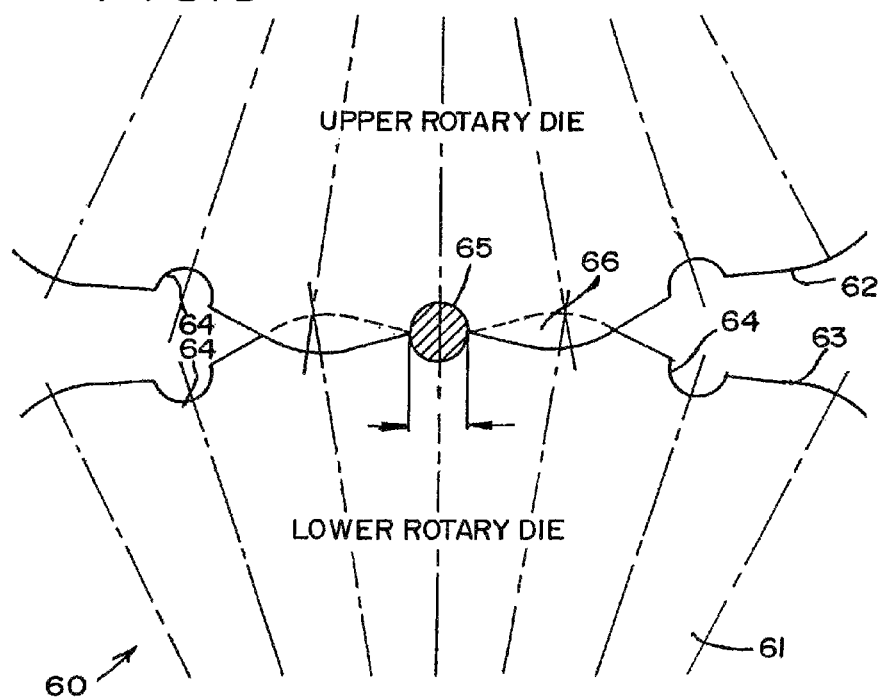

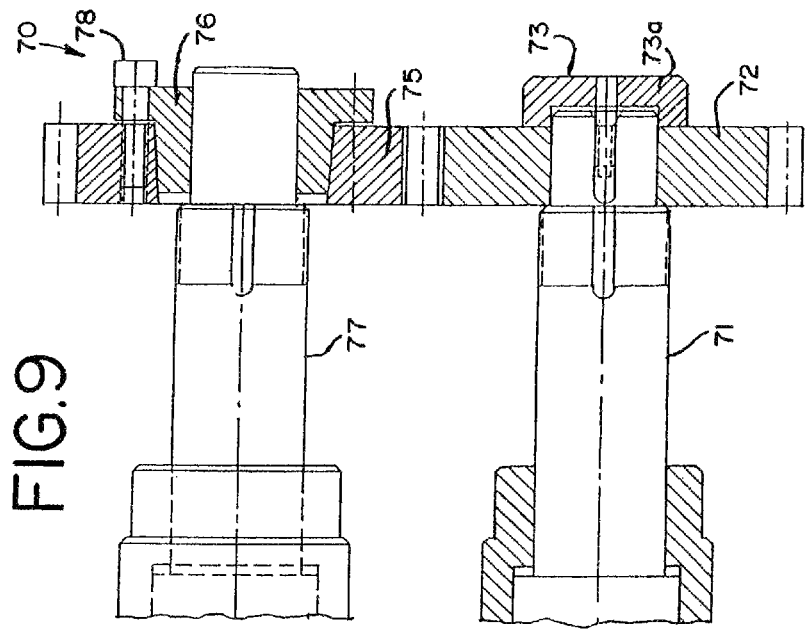
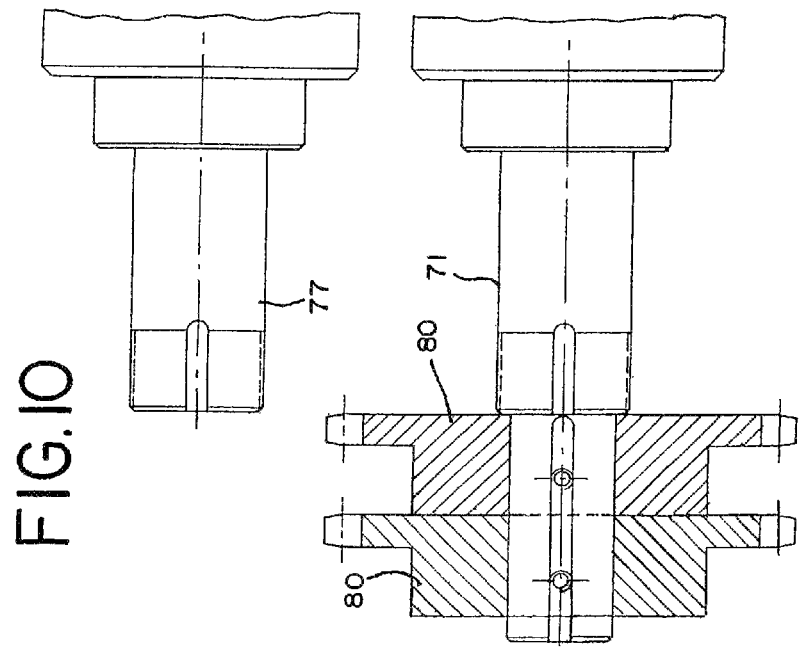

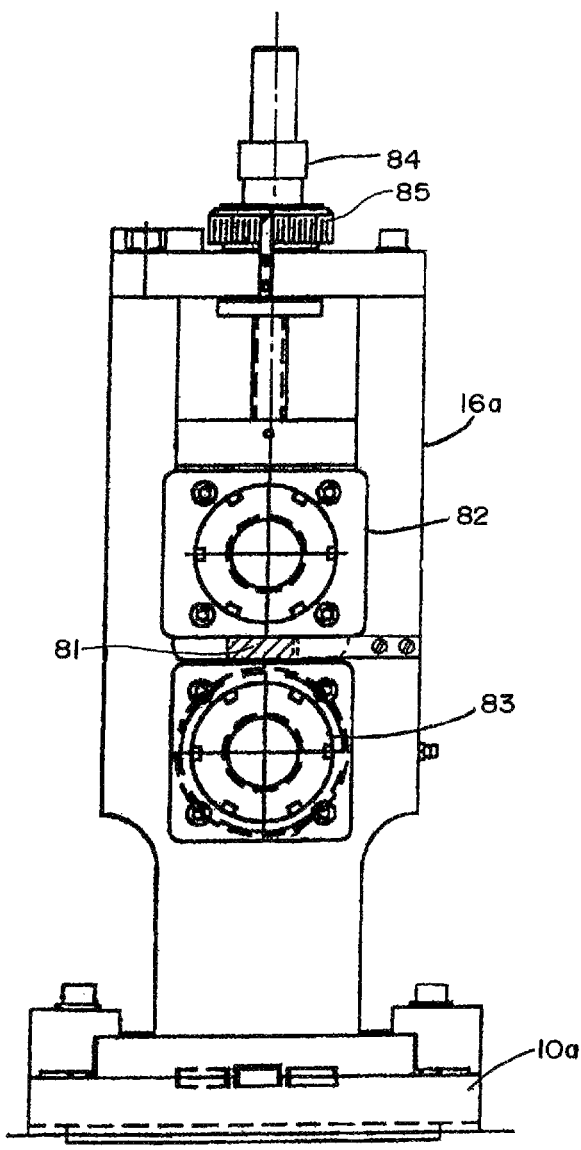
FIG. IIA
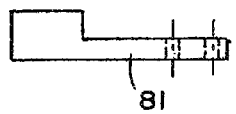
FIG. IIB

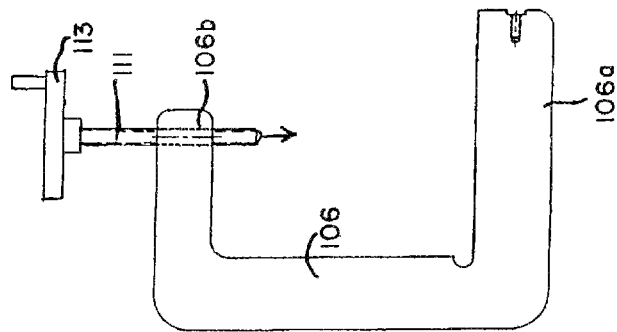
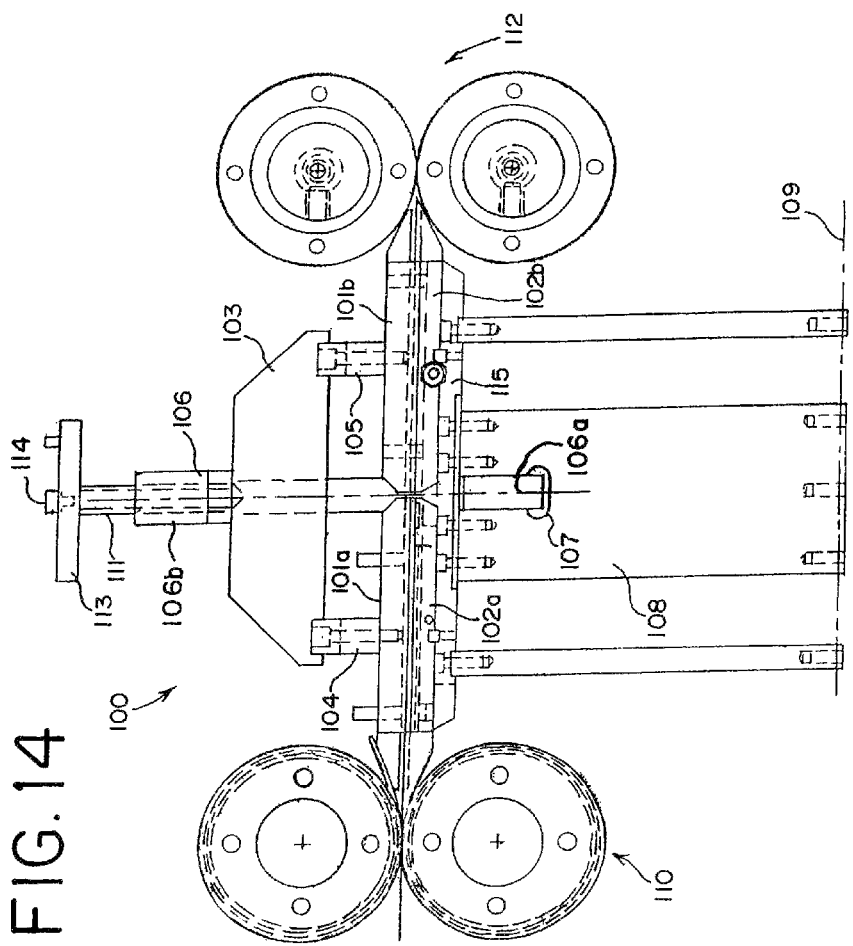

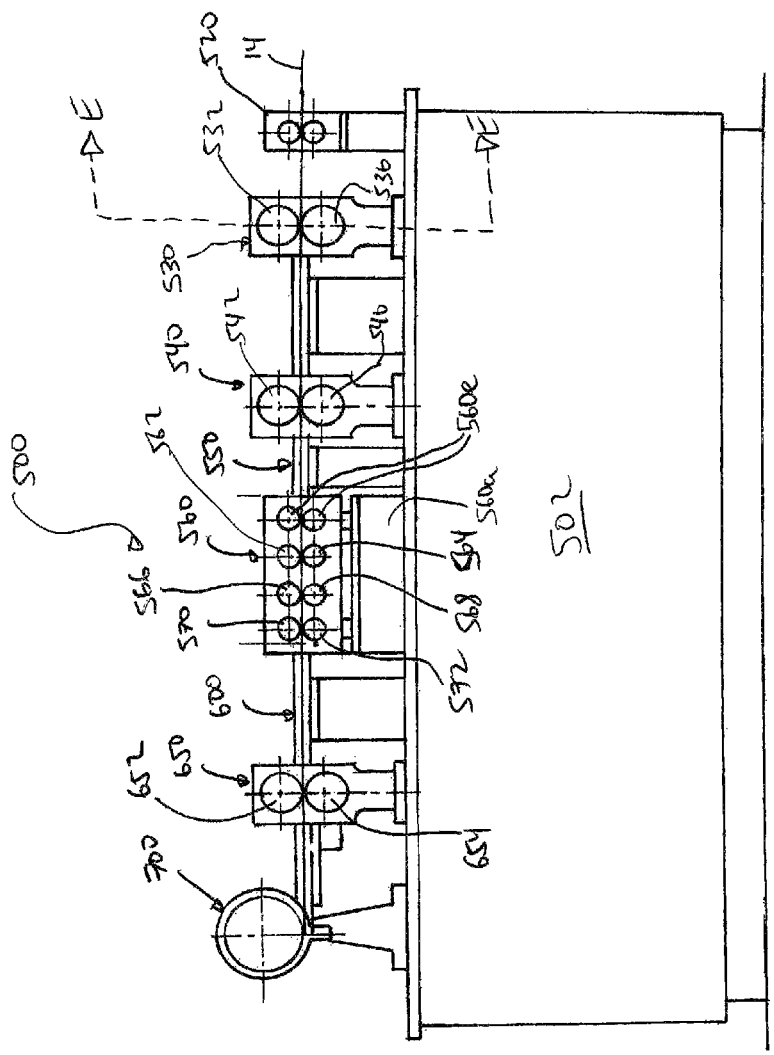

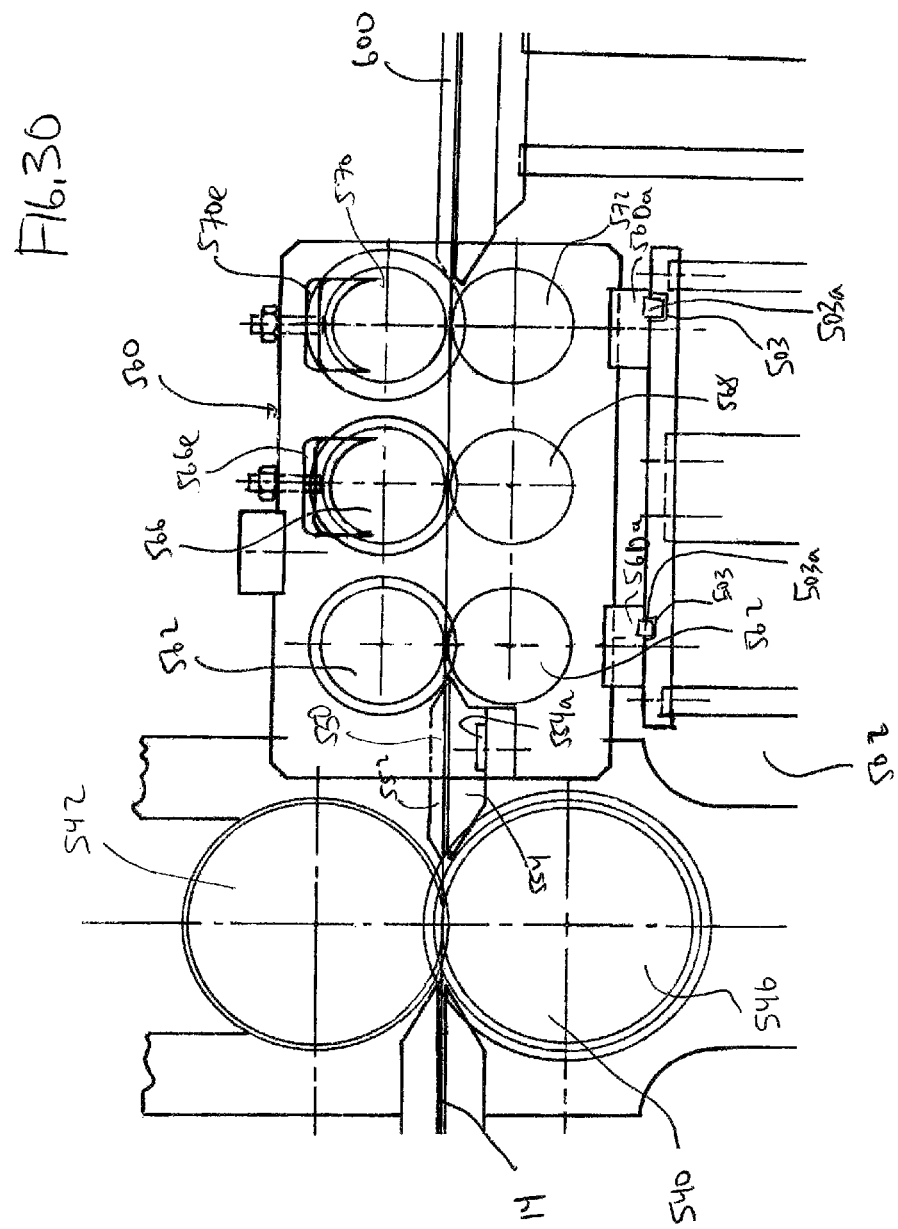

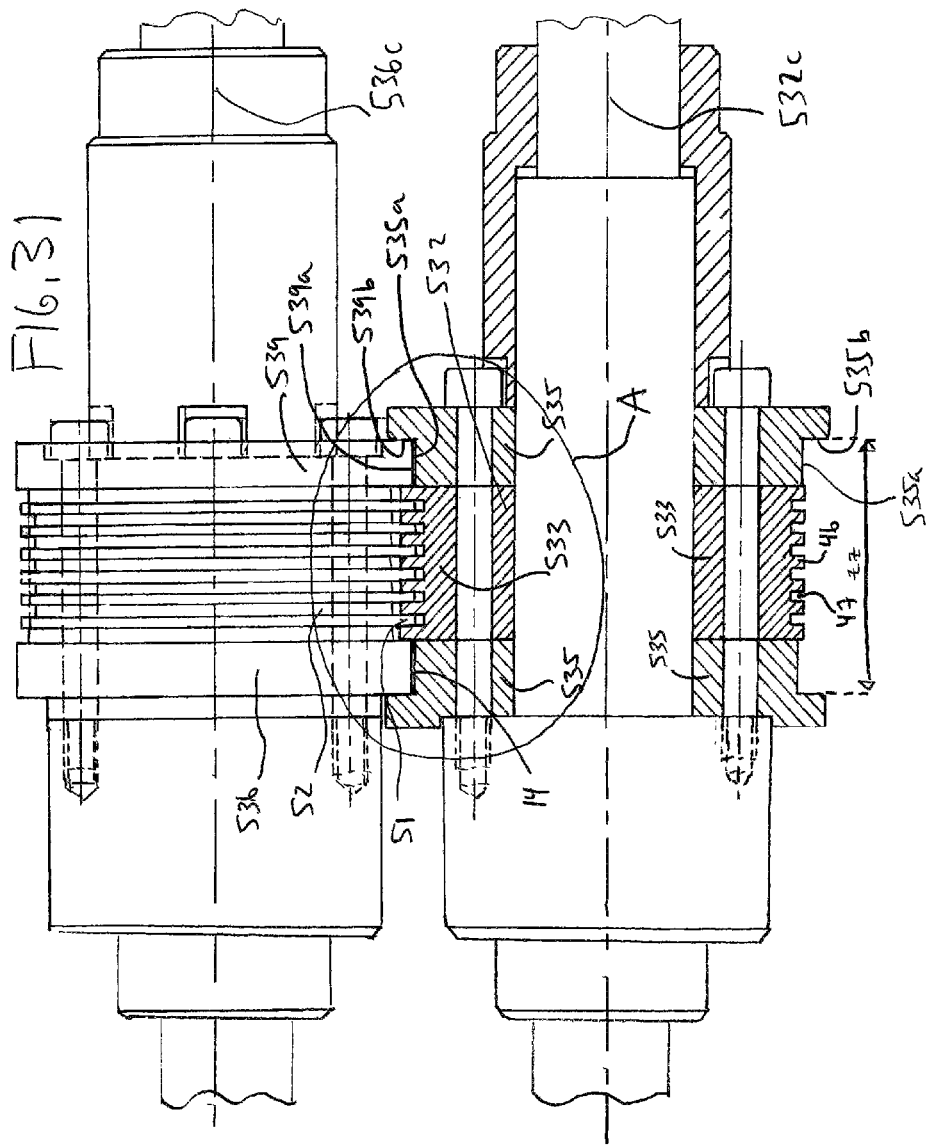

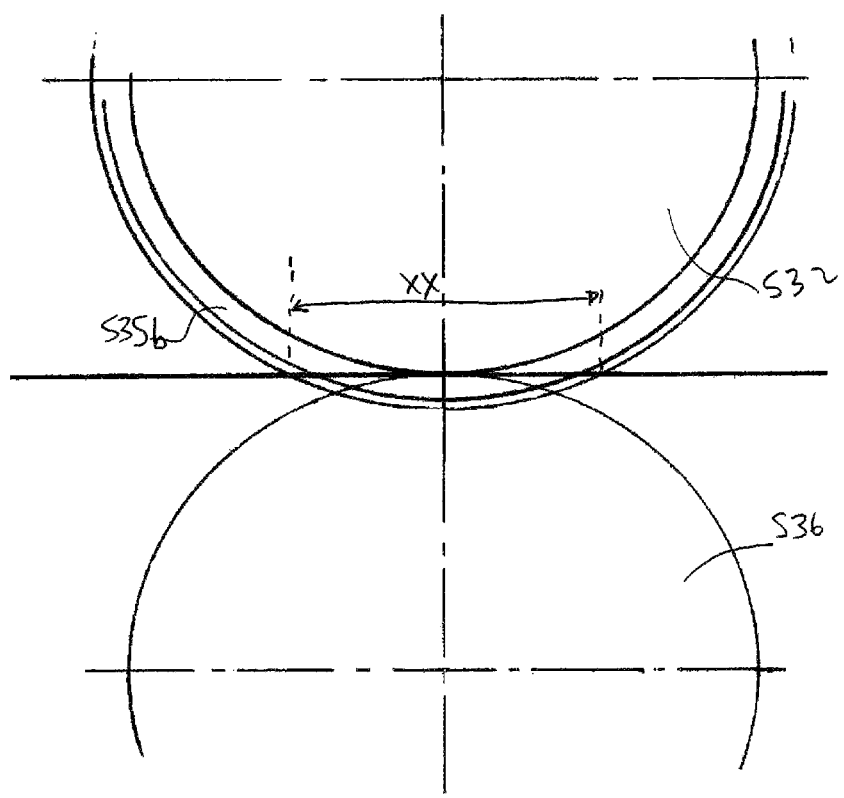

MACHINE TO PRODUCE EXPANDED METAL SPIRALLY LOCK-SEAMED TUBING FROM SOLID COIL STOCK

This application is a continuation-in-part of United States nonprovisional application Ser. No. 12/049,769, filed on Mar. 17, 2008, which is a continuation-in-part of PCT Application No. PCT/US06/35083, filed on Sep. 8, 2006, designating the United States and published in English, which claims the benefit of the filing date of Provisional U.S. Patent Application Ser. No. 60/718,974, filed on Sep. 20, 2005, each of which are hereby incorporated by reference in their entirety.

FIELD OF THE INVENTION

The field of the invention is that of manufacturing tubing and forming tubing from expanded coilstock, which is typically steel. The field of the invention also includes first forming the expanded coilstock and then directly forming the tubing spirally, which may be used for filters of all types, air, oil, and water, and separators. Such tubing may also be used for heating, ventilating, and air-conditioning (HVAC) systems as well as silencers.

BACKGROUND

A large potential for small diameter spiral pipes exists in the filtration market, such as automotive oil and air filters, as well the HVAC market, such as insulated duct systems and silencers. These products typically have a perforated inner metal cylinder that is at least one inch diameter, and an outer cylinder mainly to support the filter medium, which is usually paper. Because pipes such as these need to be accurately and cleanly cut in large quantities, a forming and cutting apparatus is necessary. There are several known ways to form and cut a pipe. A pipe may be formed by spirally or helically by winding a continuous strip of metal, and joining adjacent edges of the wound strip to form a spiral lockseam in the pipe, as shown in U.S. Pat. No. 4,567,742. In some pipe forming and cutting machines, the spirally formed pipe is cut by moving a knife outside the pipe into an overlapping position with a knife inside the pipe. Other types of spiral pipe forming and cutting machines use multiple knives or rotate the knives around the pipe to cut the pipe into sections, as shown in U.S. Pat. No. 4,706,481.

The performance of the filter depends on the performance of the spiral pipe, typically an outlet at the center of the filter, where a strong flow of air or liquid is applied. A reliable and strong filter must be maintained to resist pressure and to insure functioning of the filter. An air filter consists of perforated inside and outside tubes with medium in-between. An end-cap closes one end of the filter, while the other end-cap closes the only medium surface, leaving a central area for inflow/outflow. The filter cleans by applying suction to the open-ended end-cap, drawing air through the filter medium, which retains debris.

Oil or liquid filters and separators typically have a solid outer tube and a perforated inner tube. The liquid to be filtered or separated is brought through one end between the outer tube and the medium. Under pressure, the liquid flows through the medium, which retains debris, and the liquid then flows through the perforated inner tube and leaves the filter. The filter element, or medium, is typically paper, but need not be, and may be made from any of a number of other materials.

In a double-wall HVAC system, the outer tube is solid and the inner tube is typically perforated. Insulation medium is inserted between the outer and inner tubes. The purpose of the medium is to reduce noise as well as heat transfer between the transported air and the outside environment. Silencers, made in a similar double-wall manner, are strategically placed into HAC ductwork systems to reduce noise. The perforations in the center pipe necessary for the filter to function may be achieved in several ways.

The strip or coil used for the central pipe may be perforated off-line, that is, in a separate operation. Of course, this requires separate operations for perforating the metal. Perforating off-line has some advantages, in that a stock of perforated sheet metal may be accumulated and stored for later use. This technique, however, also has several disadvantages. One disadvantage is that expanded coil is usually purchased from a vendor with expensive expanding machinery, and the price of expanded metal is thus expensive compared to coilstock. Another disadvantage is that inventories of perforated coilstock may tend to accumulate, driving up inventory and thus adding additional manufacturing cost. Another disadvantage is that perforated steel tends to rust. The longer the inventory is kept, the more severe the problem may become. What is needed is a way of perforating the coilstock in a "just-in-time" manner. Such a technique would avoid the accumulation of inventories of coilstock, would prevent inventories from deteriorating, would help to keep manufacturing costs low, and would eliminate dependence on expanded metal suppliers, with delivery and price variations.

BRIEF SUMMARY

One embodiment is an apparatus for continuously perforating coilstock and forming tubing. The apparatus comprises first and second cutter stations for receiving and perforating the coilstock, a spreader for receiving and expanding the perforated coilstock, and a tubing machine for receiving the expanded, perforated coilstock and forming the coilstock into tubing. The first and second cutter stations each include a tool for perforating coilstock.

Another embodiment is an apparatus for continuously perforating coilstock and forming tubing. The apparatus comprises at least one cutter station for perforating the formed coilstock, a form roll unit to form edge portions thereon, a spreader that receives the perforated coilstock and spreads the coilstock, a strip guide plate assembly for re-forming the spread coilstock, a drive roller station for pulling the coilstock through the apparatus, and a pipe forming machine for forming the spread coilstock into tubing and cutting the tubing into a desired length.

Another embodiment is an apparatus for continuously perforating coilstock and forming tubing. The apparatus comprises, a first cutter station for perforating the formed coilstock, a second cutter station for again perforating the perforated coilstock, a roll form unit for forming sides of the coilstock, a spreader that receives the perforated coilstock from the second cutter and spreads the coilstock, a strip guide plate assembly for flattening the spread coilstock, a drive roller station for pulling the coilstock through the apparatus, and a pipe forming machine for forming the spread coilstock into tubing and cutting the tubing into a desired length.

Another embodiment is a method for forming pipe from coilstock in a single continuous process. The method comprises providing coilstock, forming edges on opposite sides of the coilstock, introducing a first set of perforations into the coilstock, introducing a second set of perforations into the coilstock between the first set of perforations and expanding the coilstock, and forming the coilstock into tubing.

In addition to the above-mentioned advantages, the invention also has the advantage of expanding coilstock in a manner that leaves the edges of the coil strip material solid, before it is made into a spirally wound tube. Solid edges make the tube-forming processes easier and the tube itself stronger, compared to a tube with edge-to-edge fully expanded strip material. There are many embodiments of the invention, only a few of which are depicted in the attached drawings and which are discussed in the description below. It will be understood that the drawings and descriptions are meant to be descriptive, not inclusive, and that the invention will be defined by the claims below, and their equivalents.

BRIEF DESCRIPTION OF THE DRAWINGS

FIG. 2 is an elevation view of one embodiment;

FIG. 3 is a top view of sheet metal as it travels through the forming equipment in one embodiment;

FIGS. 4a, 4b and 4c are cross-sectional views of a profile of the sheet metal as it is processed by the forming machinery;

FIG. 5 is an elevation view of a first portion of the process, the form roll unit (FRU);

FIGS. 7a and 7b are, respectively, elevation and plan views of the sheet metal as it undergoes slitting in two successive steps;

FIG. 8 is an elevational view of the rotary dies as they slit sheet metal;

FIG. 9 is a partial cross-sectional view of a cutter station driven side;

FIG. 10 is a partial cross-sectional view of a first cutter station drive side;

FIGS. 11a and 11b are side views of a cutter station and a gauge stop;

FIG. 14 is a plan view of tooling for the spreader;

FIG. 14a is an elevational view of a retaining hook;

FIG. 28 is an elevation view of another embodiment of a processing line.

FIG. 30 is a detailed elevation view of view of FIG. 29.

FIG. 31 is a partial cross-sectional view about section E-E of FIG. 28.

FIG. 33 is a side view shown engagement between the first and second dies and an edge of the coilstock.

DETAILED DESCRIPTION OF THE DRAWINGS AND THE PRESENTLY PREFERRED EMBODIMENTS

Figure 1:
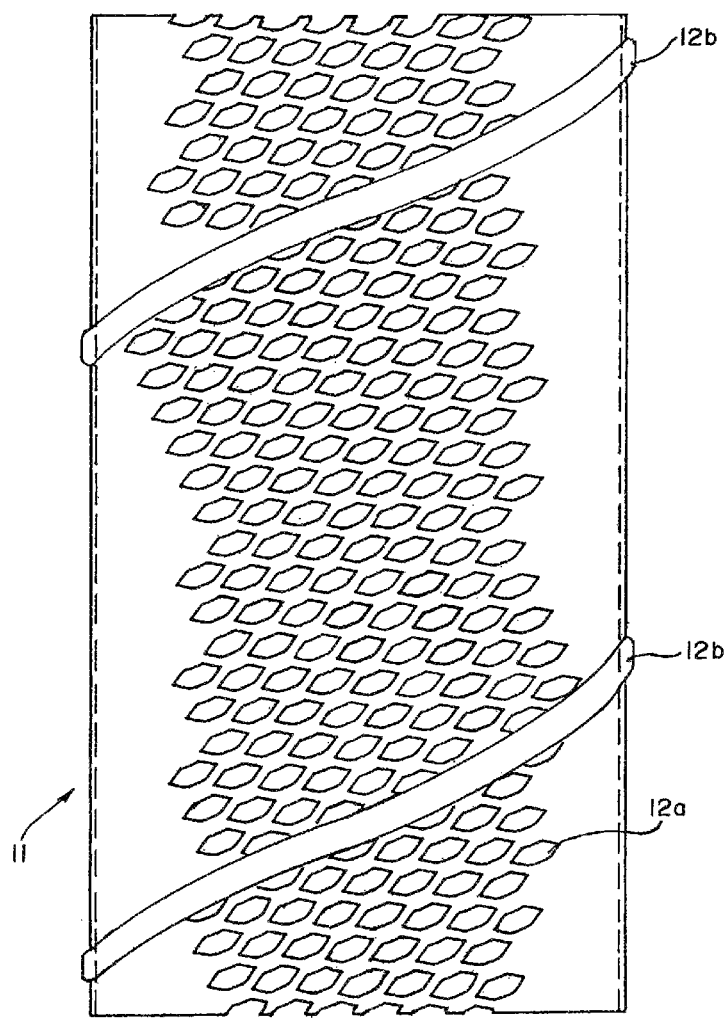
FIG. 1 is a frontal view of the seamed, expanded-metal tubing product to be produced by embodiments of the invention.

The machinery and process used to produce expanded metal in a form immediately useful for producing seamed tubing is described below. The product desired is depicted in FIG. 1. Perforated tubing 11 is formed from sheet metal that has been perforated and expanded. The process that expands the metal preferably includes steps to form edges on the sheet metal so that the edges can later be joined to form a continuous cylinder of a desired length. The cylinder includes expanded metal 12a formed into a cylindrical shape with edges from the sheet metal joined into seams 12b that hold the shape together. The edges that form the seam may require together about 0.75 inches of width (about 19 mm), in addition to the width required to form the tubing.

The machinery that accomplishes this process begins with steel or aluminum coilstock, or other metal or material as desired, and ends with tubing as depicted in FIG. 1, which is then preferably cut into desired lengths automatically. One embodiment of a processing line 10 that accomplishes this is depicted in FIG. 2. The equipment is preferably mounted rigidly on a base 10a. In one embodiment, the length of the process equipment in FIG. 1 is about 10 feet long. In other embodiments, the process may require longer process lengths for the coil. The process begins with coilstock 14 that is preferably fed from an unwinder (not shown), into a form roll unit (FRU) 13. The form roll unit takes flat coilstock and uses rotary forming dies to process the coilstock into a desired profile (cross-sectional form) so that the coilstock may be more easily processed into the desired end-product. The driving force for moving the coilstock through the process is provided by the drive rollers 15.

Coilstock 14 with the desired profile now enters a first cutter station 16a. The first cutter station includes rotary dies for a first perforation of the coilstock, part of the process to eventually "expand" the coilstock. If desired, the process may also include a first strip guide plate assembly 16b before entering a second cutter station 17a. The guide plate assembly includes dies or other forming machinery to adjust or "finetune" the position of the coilstock before the coilstock advances to the next process. Second cutter station 17a includes rotary dies for a second perforation of the coilstock.

The coilstock was slit one or more times in order to allow horizontal widening or expansion of the metal. This is accomplished with a spreader 18. The spreader includes dies that channel the slit coilstock through a gradually-widening horizontal path as it travels through the spreader, pulled through by the drive rollers in the spreader station. Two cutter stations are preferred. In general, to achieve close spacing of slits requires two cutter stations, with the most-closely spaced slits on different cutter stations. This allows for wider and stronger tools. This also avoids placing too many features on a tool too close together, and thus makes it easier to make the tools for the cutter stations. While it is not impossible to produce closely-spaced slits with a single cutter station, it is much easier to avoid high stress on the tooling, to avoid tears and crinkles on the coilstock, and to make the tools more economically, by using two stations rather than one.

After passing through one or more cutter stations and a spreader, the coilstock has been slit and because of the action of the rotary dies, is at least partly expanded in vertical direction, with metal stretched both above and below the plane of the coilstock, in addition to horizontal spreading. Therefore, a flattening station 15, preferably with drive rollers, is used to flatten the coilstock before further processing. If desired, an additional strip guide plate assembly 19 may be used to adjust the profile of the coilstock before the now slit and expanded metal is fed to a pipe forming head 20 where the coilstock will be wound, formed into a cylindrical coil, and cut to length.

In order to start the process, it will be necessary to hand-feed coilstock through at least a portion of the line. In addition, it may be necessary during production runs to clear the line if jam-ups or breaks occur. Therefore, it will be helpful to be able to raise the upper portions of the strip guide assemblies. Accordingly, a way should be provided to raise the upper portions of the guide plate assemblies, such as with handwheels 16c, 19b, and 18b to enable operators to raise and remove the upper portions of guide plate assemblies 16b, 19a and the upper portion of spreader 18.

FIG. 14 depicts a spreader strip guide plate assembly (spreader assembly) 100 that may be used to expand the coilstock after it has been perforated. Spreader strip guide plate assembly 100 receives coilstock (not shown) after the coilstock has been slit. The coilstock is pulled though the process by drive rollers 112. In this embodiment, spreader assembly 100 includes two upper spreader guide plates 101a and 101b, and two lower spreader guide plates 102a and 102b. The plates are mounted on guide plate base 108 which may be secured to spreader base 109, or to the machine base 10a (FIG. 2).

Plate 103 pushes down on upper guide plates 101a, 101b with adapters/handles 104, 105. In order to push down on the plate and thus on the upper guide plates, a large fixed hook 106, see FIG. 14a, is provided, the hook mounted to guide plate base 108 and slidable in and out through slot 107. Hook 106 is in the shape of a large C-clamp that is open on one side and has an upper portion that has internal threads 106b. A threaded rod 111 is assembled through the threaded portion 106b of hook 106. A handwheel 113 is provided and is secured to threaded rod 111 by bolt 114. In order push down on plate 103 to secure in place the upper guide plate portions, a user simply turns the handwheel in the downward direction, reacting threaded rod 111 with internal threads 106b of hook 106, pushing plate 103 and adapters 104, 105 against upper guide plates 101a, 101b. In order to raise plate 103, the hand wheel is turned in the opposite direction to relieve the pressure on plate 103. Plate 103 may then be removed with handles 104, 105. The upper guide plates may then be raised to feed or clear the spreader station. The pressure on plate 103 may be adjusted so that the proper degree of pressure is applied to plates 101a, 101b. A plate, hook, and handwheel may also be used in guide plate assembly 16b.

As the sheet metal travels through the process it changes form, as depicted in FIG. 3. Coilstock 14 leaves the FRU 13 with a flange formed on one side 23 and a channel 24 formed on the other side. Coilstock 14 then enters the first cutter station 16a and is slit by rotary dies, forming a first series of slits 21 as desired. The coilstock then enters second cutter station 17a and is slit or perforated a second time, with a second series of slits 22 preferably placed between the first series of slits 21. After slitting, the slit coilstock 14b enters the spreader 18. Channels in a die (not shown) cause the metal to expand, forming ever-widening diamond-shaped perforations 25, 26, 27 in the coilstock. Drive rollers (not shown) are positioned in the distal portion of the spreader 18 to more directly pull the now-expanded coilstock 14c through the spreader.

Figure 25:
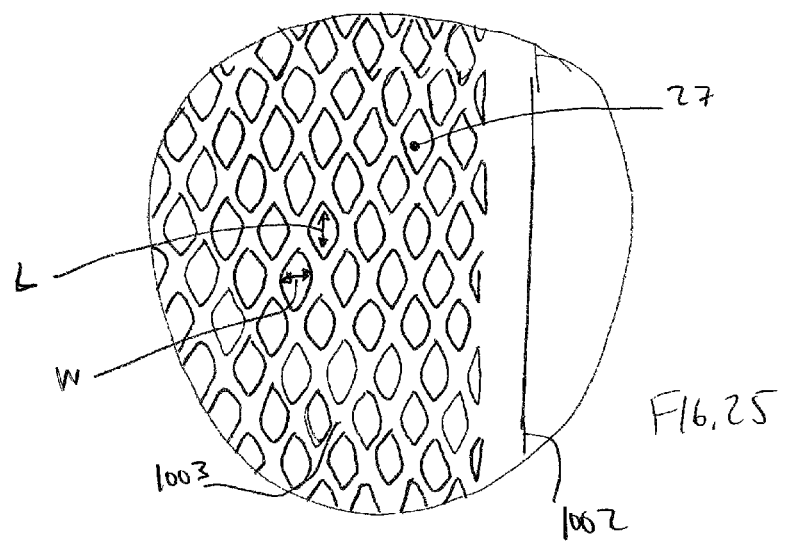
FIG. 25 is a view of detail Z of FIG. 3.
Figure 26:
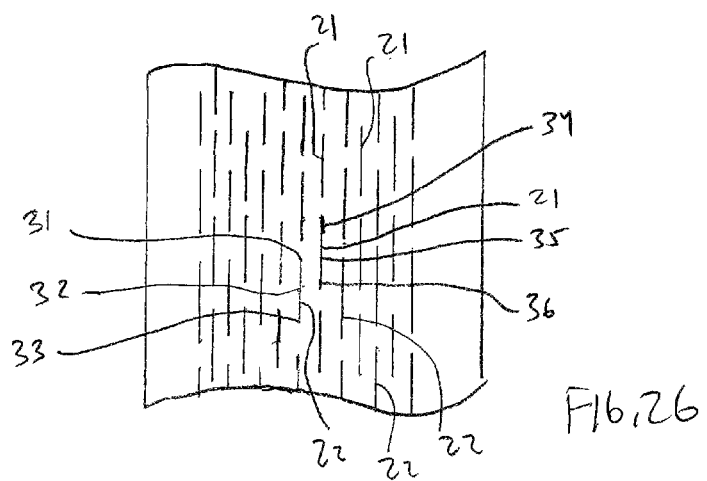
FIG. 26 is a top view of a portion of the stock prior to entering the spreader.

In some embodiments, with reference to FIGS. 3, 25, and 26, the expanded coilstock 1014 is configured such that the plurality of perforations each have a length L disposed in a direction substantially parallel to the direction of feed through the spreader and a width W disposed in a direction substantially perpendicular to the direction of feed Z. Further, each of the first plurality of slits 21 include 34, a middle 35, and a rear 36, while each of the second sets of slits 22 include a front 31, a middle 32, and a rear 33. The first sets of slits 21 are disposed such that the front and rear ends 34, 36 of the slits are disposed substantially in-line with a middle portion 32 of the neighboring second sets of slits 22. Similarly, each of the front and rear ends 31, 33 of the second sets of slits 22 are disposed substantially in-line with a middle portion 35 of the neighboring first sets of slits 21.

The shape, opening size, and percentage of open area in the expanded metal are determined by the width of the coilstock, the number and spacing of the slits or perforations, and the expanded width of the perforated coilstock. In one embodiment, steel coilstock from 20 to 27 gauge is perforated first with six slits, forming 7 areas between edges of the coilstock. These seven areas are then perforated again, in their centers, thus forming 13 slits between the flange and channel sides of the coilstock.

The shape of the coilstock is important in determining how easily the drive rollers can pull the coilstock through the several stations of the process. The channel and flange sides of the coilstock are also important, because they will eventually be needed to form seams for the desired tubing or piping to have sufficient length. One desired progression of the shape or profile of the coilstock is depicted in FIGS. 4a, 4b and 4c. As shown in FIG. 4a, the cross-section 27 of the coilstock as it emerges from the form roll unit preferably has two right-angle bends on the flange side and on the channel side, forming lengths at right angles to the plane of coilstock 27. The channel side bend 27b preferably also has an extra length 27c as shown, at an angle to the metal bent at right angle. This angle may be any suitable angle from about 30° to about 60°. Lengths 27a and 27c preferably are equal so that length $H_1$ is equal to length $H_2$.

After perforating, and as discussed above, the coilstock is spread and then passes through drive rollers for flattening. During this process, the profile is re-formed as shown in FIG. 4b. Profile 28 is re-formed so that the coil stock 28 has the shape depicted in FIG. 4b. Flange side 28a continues to have the right angle bend which will eventually be inserted into the channel side form 28*b*. The stiffer right-angle bend is no longer needed for the guide rollers to pull the sheet metal through several energy-consuming processes. Finally, after the flattening station, the profile 29 of the coilstock is adjusted as shown in FIG. 4*c*, so that the flange side bend 29*a* is roughly parallel to the outer portion of channel side 29*b*, for ease in forming the seam of the desired tubing in pipe-forming head 20.

Greater detail will now be given for the individual elements of the process. As shown in FIG. 5, form roll unit (FRU) 13 receives coilstock 14, the coilstock preferably clean and rust-free. In order to ease the processing of the preferably metallic coilstock, a lubrication station 44 is provided. The lubricant may be in the form of pulsed, misting lubrication, and may be provided on the top or on the bottom of the coilstock, or on both. The amount of lubricant that remains on the coilstock should not cause the coilstock to slip in its driving rolls, but should be such as to minimize frictional forces during deformation by the FRU or by one of more strip guide plate assemblies downstream. FRU 13 preferably has one or more stations (sets of rotary dies) to form the coilstock profile depicted in FIG. 4*a*. The configuration of the dies in the FRU may be designed on the basis of the amount of deformation required of each set of dies, or may be determined in any other suitable way. FRU 13 is preferably mounted rigidly on an FRU base plate 41, which is preferably mounted to a machine base plate 42 for the FRU and other process machinery as described in FIG. 2.

Figure 6A:
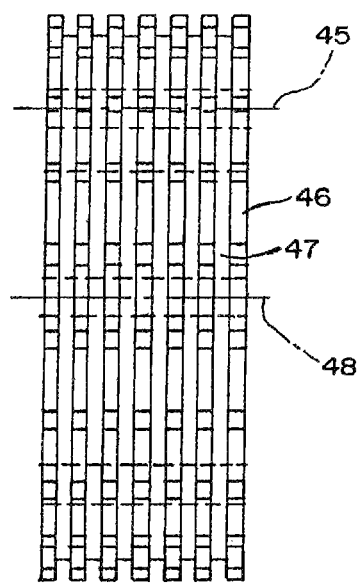
FIGS. 6a, 6b, and 7 are views of rotary dies used to perforate the sheet metal.
Figure 6B:
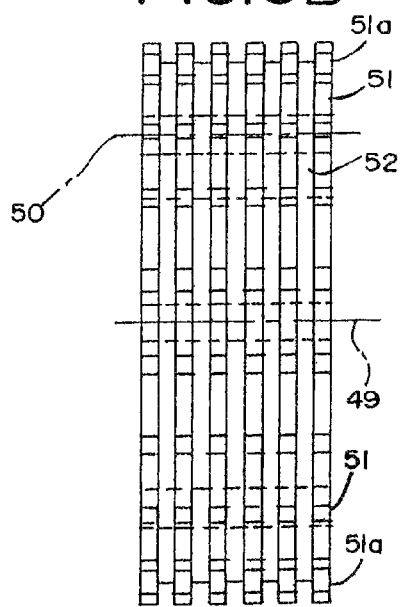
Figure 7:
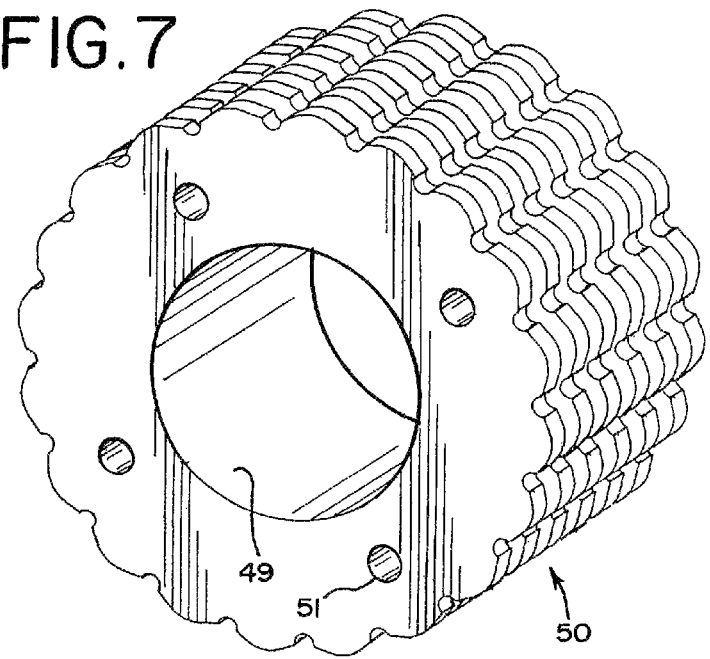

The rotary cutting or slitting dies are depicted in FIGS. 6*a*, 6*b* and 7. One set of dies is used in each cutting station. These dies are used to place slits or cuts in the sheet metal in a desired pattern. Only one set of slitting dies or other cutters (such as perforating knives) are required, but more than one may be used. Any desired configuration of perforations may be used. In one embodiment, a first set of slits in sheet metal is made by using two rotary dies 50. Each rotary die 50 includes six lands 51 and five grooves 52, and a center bore 49. The lands include reliefs or cutouts 51*a* as depicted in FIG. 8. When dies 50 are aligned vertically in a cutter station, the lands of one die are aligned with the grooves of the other die. This allows the aligned lands to pierce the sheet metal with minimal side distortion.

To make a second set of slits, another rotary die 45 may be used with rotary die 50. In this instance, rotary die 45 includes seven lands 46 and six grooves 47. Dies 45 and 50 are preferably the same diameter. The lands 46 of rotary die 45 may include the same semi-circular reliefs described above for rotary die 50. In this embodiment, die 45 is designed so that the slits or cuts produced by dies 45 and 50 lie centered in the slits made previously by dies 50. FIG. 7 is an isometric view of rotary die 50, with center bore 49 and alignment bores 51.

The desired pattern 53 is depicted in FIGS. 7*a* and 7*b*. FIG. 7*a* depicts a cross-section of sheet metal 14 after first and second cuts have been made, while FIG. 7*b* depicts a top view of where the slits are made across the width of the sheet metal web. The second set of dies makes the slits in outer row 54*b* and in every second row thereafter. The first set of dies makes the slits in second row 55*b* and in every second row thereafter. The slits in each row are preferably offset by one-half the pitch of the slits, the pitch being the distance from the start of one slit to the start of the next slit in the same row. In this instance, the pitch is designated as distance J. Each row of slits is preferably separated from each other row by the same distance, designated as K in FIG. 7*b*.

The profile of the expanded metal is shown in FIG. 7*a*. As shown in FIG. 7*b*, the first set of dies makes row 55*b*, and the profile of the metal that has been moved in making the slits is depicted as row 55*a* in FIG. 7*a*. Note that the top points of row 55*a* coincide with the center of each slit in row 55*b*. In the same manner, the high points of row 54*a* coincide with the centers of the slits in row 54*b*. It is preferable if the movement of metal resulting from the slitting process is equal in both up and down directions from the center of coilstock 14, as shown in FIG. 7*a*, with distance L/2 in both up and down directions. The actual amount of movement is determined by the thickness of the coilstock and the desired amount of expansion. In one embodiment, 27 gage sheet metal (0.016 inches thick) is used with dies that move the metal about 0.096" above and below the plane of the web. The dies also make 13 rows of slits separated by about 0.060 inches.

The construction of the dies to make these cuts is shown in FIG. 8. A set of rotary slitting dies 60 includes identical upper and lower dies 61, 62. The outer diameter 63 of the dies between semi-circular reliefs 64 is the shape of the cut or slit that will be made in the sheet metal, as seen in the coincidence between the front (solid) lines of upper die 62 and the rear (dashed) lines of lower die 61. Reliefs 64 of the upper and lower dies coincide once per pitch or segment where the reliefs momentarily form a circular relief 65. This corresponds to the space between slits in FIGS. 7*a* and 7*b*.

Adjustment or alignment may be needed for proper positioning of the upper die with respect to the lower die in each cutting station. An adjustment mechanism is depicted in FIG. 9. Adjustment for gear 75 and thus driven (upper) roller or shaft 77 is provided by tapered split bushing 76 which is fastened to driven gear 75 with bolt 78. Adjustment is accomplished by unlocking the tapered split bushing of the upper shaft 77 and turning the drive (lower) shaft 71 until the lower shaft has its cavity at TDC (top dead center), as shown in FIG. 8. Then the upper roller is rotated to match the lower cavity until a pin will slide into relief 65 as shown in FIG. 8. The split taper bushing is then locked in place.

When the upper and lower cutting dies are in registration, the semi-circular cutouts on the outer surfaces of the lands will align during rotation to form a complete circle, as shown in FIG. 8. To check this, an operator can jog the machine to check if a go/no-go gauge can be inserted into matching cut-outs 64 as shown with relief 65.

Power is provided to the stations used in the slitting and expansion process via chain drives on one side of the line. Power may be thus provided to lower roll or drive shaft 71 with drive gear 72. Drive gear 72 is affixed to the drive shaft with bolt 73 and lock washer 73*a*. Drive gear 72 meshes with driven gear 75 via split bushing 72 for driving driven shaft 77.

Power for the cutting station is provided by a double sprocket system using identical sprockets or gears 80 mounted in tandem with drive shaft 71 and causing drive shaft 71 to rotate. One sprocket 80 receives power from a chain extending directly from a drive station or through one or more process stations. The other sprocket 80 may transmit power to another process station further down the line. Sprockets and chain drives are preferred because the timing is important in keeping the cutting stations coordinated if more than one cutting station is used. This is important to keep the first set of slits aligned with the second set of slits. If timing is not important, another method, such as sheaves and belts may be used.

It is also important to make sure that the lands of the upper die do not extend too low, or that the lands of the lower dies do not extend too high. In order to insure this, a cutter stop depth gauge may be used between the dies. As shown in FIGS. 11*a* and 11*b*, a cutter station 16*a* mounted on base 10*a* may include an upper die assembly 82 and a lower die assembly 83. A cutter stop depth gauge or spacer 81 is placed between the housings of the upper and lower dies to prevent adjustment of the upper die bearing housing from extending too low and thus causing undesirable interference between the dies. Lower roller 83 is fixed vertically, and vertical adjustment of the dies is provided only for upper roller 82. Spacer 81 is placed between the bearing housings of upper and lower rollers 82, 83. Adjustment of upper roller 82 is provided by manual adjustment of threaded rod 84 and nut 85. Nut 85 is mounted atop cutter station 16*a*. FIG. 1*l* b is a top view of spacer 81, showing that spacer 81 is provided with bolt holes for mounting between the bearing housings 82, 83.

Figure 12A:
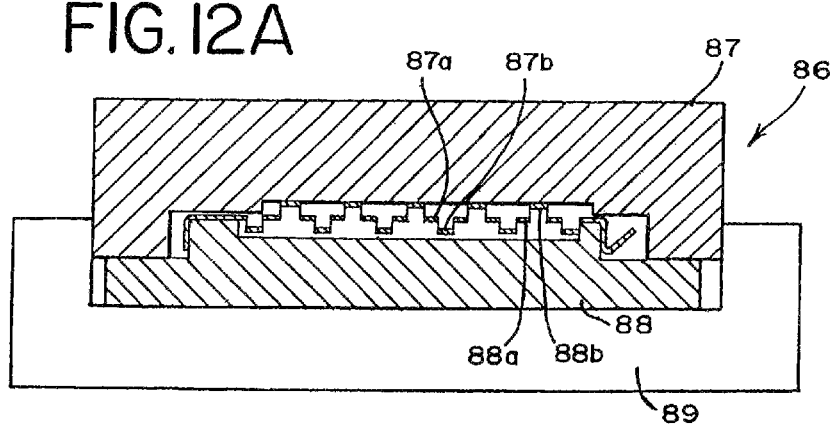
FIGS. 12a, 12b, and 12c are cross-sectional views of a guide plate assembly.

As discussed above, guide plate assemblies may be used after one or more of the processing stations in the line depicted in FIG. 2. Guide plates and assemblies of an upper and lower guide plate, do not have moving parts, but are similar to extrusion dies. A metal web or coilstock with sufficient lubrication may be pulled through the die to make slight adjustments in the profile of the web. A typical guide plate assembly 86 is depicted in FIG. 12*a*. The assembly includes an upper guide plate 87 and a lower guide plate 88. Upper guide 87 plate may rest on lower guide plate 88, which rests on guide plate support 89. Guide plates 87, 88 preserve the coil stock profiles 87*a*, 88*a*.

In order to minimize tearing or ripping of the coilstock while re-forming the coilstock in the guide plate assembly, there is desirably a gap between the upper and lower guides. The gap at the edges of the guide plates (where only non-slit coilstock is run) should be wide enough to allow an adjustment to the profile, but not so wide that raised and lowered portions resulting from slitting are not somewhat pressed back toward the plane of the coilstock, and also not so loose as to loose control of the web. The gap between the upper and lower guides must be at least the thickness of the metal with some extra tolerance. The gap is desirably about equal to the thickness of the raised and lowered metal with an additional thickness of from about 0.005 inches to about 0.020 inches.

Figure 12B:
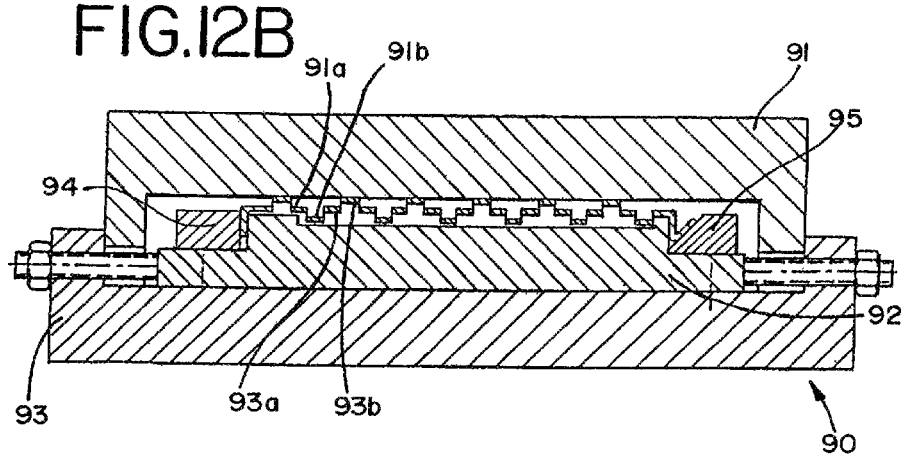
Figure 12C:
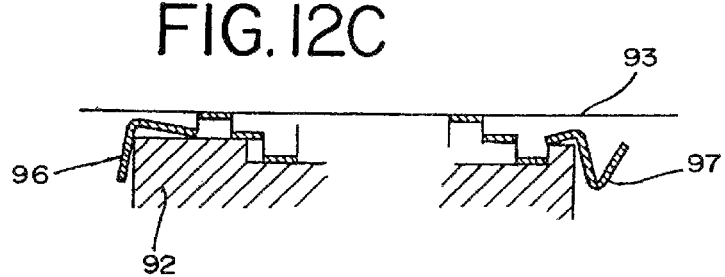

While the guide plates as discussed will re-form the bulk of the coilstock, additional steps may be needed to retain the angular configuration of the flange and channel portions of the coilstock profile. FIG. 12*b* depicts a guide plate assembly 90 with guide plate support 93, and upper and lower guide plates 91, 92. (The view of FIG. 12*b* is similar to a cross-sectional view within the spreader 100 discussed below). Lower guide plate 92 includes additional guide elements 94, 95 to help retain the form of the channel and flange portions of the coilstock as it passes through the guide plate assembly. The profile of the expanded metal is not substantially changed, continuing to retain profile steps 91*a*, 91*b*, 92*a*, 92*b*. Lower guide plate 92 has additional guide portions 94, 95. Guide portion 94 helps to retain the right-angle bend needed in the flange 96, while guide portion 95 helps to retain the outer configuration 97 needed for the channel. Guide portion 95 could also be made in a form to retain the right angle bend and the outer portion by using a guide that more closely matches the channel profile. FIG. 12*c* depicts "liftoff," one possible way in which the outer edges of the coilstock may deform if sufficient guidance is not provided in the design of the guide plate assembly. If the bending or "liftoff" is sufficiently severe, the coilstock may eventually lose track position during processing or could tear or jam in the guide plate or downstream, causing production to cease and requiring clearing of the guide plate assembly or other machines in the process.

Figure 13:
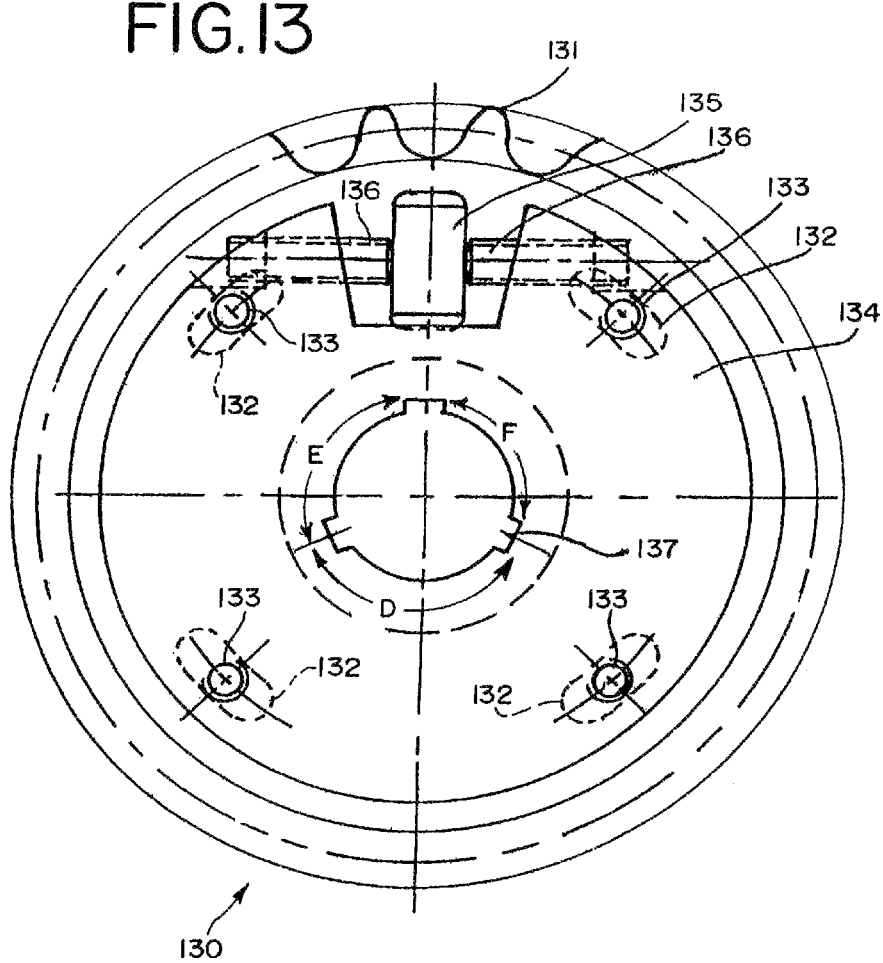
FIG. 13 is a schematic view of an adjustable sprocket mounted on a hub of a cutter station.

The process for expanding metal in an intricate manner as described above may require adjustment or fine-tuning of the angular position of one of the first or second cutter station dies so that the each slitting operation is precisely in registration with the other. One way of accomplishing this is to provide an adjustable sprocket on one or both (preferably only one) of the cutter rollers in a cutter station. FIG. 13 depicts a hub 134 of a roller shaft, the hub having three keyways 137 for engaging a sprocket 130. If the keyways 137 are separated by angles D, E, and F, then the angular position of the sprocket may be adjusted by selecting the desired keyway for the angular position of the sprocket. Sprocket 130 is mounted to hub 134 with four bolts 133 through sprocket slots 132. The angular position of sprocket 130 with respect to hub 134 is adjusted by turning hub set screws 136 against sprocket drive lip 135.

With keyways at positions other than 120° to each other, a user may adjust the angular position and also the timing of when the dies begin and end their cut into the coilstock. It is important that both cutter stations are not cutting into the coilstock at the same time, because this may result in undesirable stress on the drive train. In one embodiment, angles D, E and F may be 132°, 114° and 114°. In other embodiments, other angles may be used, such as 110°, 120° and 130°. Fine tuning may be accomplished with the set screws 136 as provided.

Figure 14B:
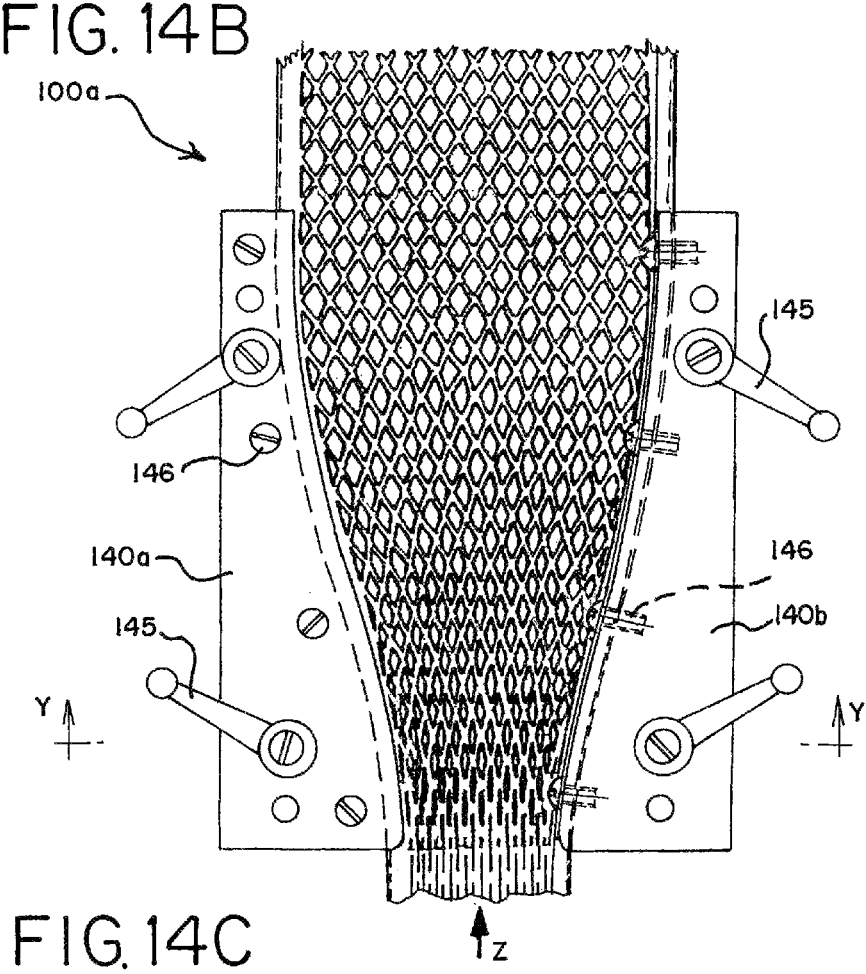
FIG. 14b is a top view of an alternate spreader.
Figure 14C:
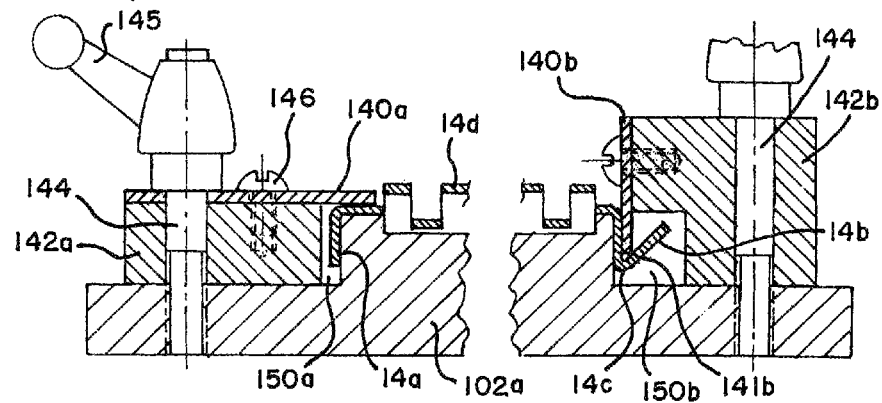
FIG. 14c is a partial cross-sectional view of the alternate spreader of FIG. 14b about line Y-Y.
Figure 15:
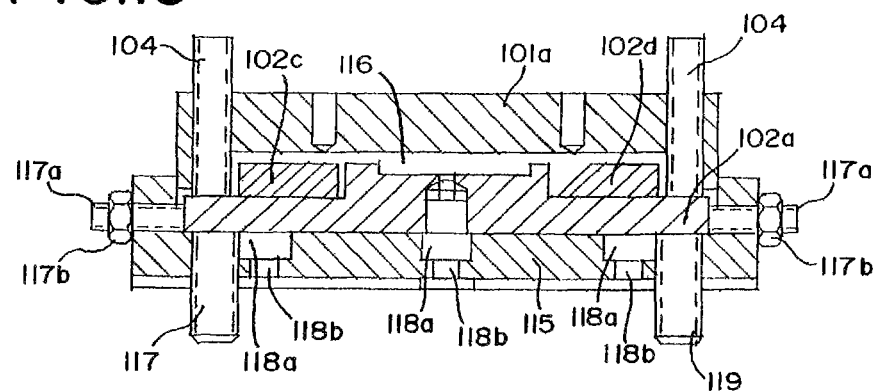
FIG. 15 is a frontal view of tooling for the spreader.

The spreader assembly is depicted in FIGS. 14 and 15. The spreader is similar in some ways to the guide plate assemblies described above. Spreader 100 is placed in line after one or more slitter roller assemblies. In FIG. 14, coilstock enters from the left after the second slitter assembly 110 and is pulled to the right by drive assembly 112. The spreader may be manufactured as a single upper and a single lower tool, or it may be made as shown in FIG. 14, with dual upper tools 101*a*, 101*b*, and two lower tools, 102*a*, 102*b*. Guide support assembly base 115 is bolted to base 108, which may be bolted to a spreader base 109, or to machine base 10*a* (FIG. 2) so that the spreader tooling is firmly fixed in place.

The spreader upper tools 101*a*, 101*b* bear on plate 103 via adapters or handles 104, 105. In order to adjust the pressure on spreader tools 101*a*, 101*b*, the assembly includes a hook 106, as shown in FIG. 14*a*, which is joined to base 108 by a transverse portion 106*a* for mechanical stability and support. The hook may move in and out of slot 108*a*. The upper portion of hook 106 includes an internally-threaded portion 106*b* whose threads match the external threads of threaded rod 111 which is connected to an adjustment handwheel 113. When a user wishes to adjust upper spreader tools 101*a*, 101*b*, the user rotates the handwheel in the desired direction. As the handwheel and stationary threaded rod 106 turn, the pressure on plate 103 and tools 101*a*, 101*b* is increased or decreased according the direction the handwheel is rotated. When rod 111 is raised and the pressure is released from plate 103 and tools 101*a*, 101*b*, they may be removed, moved, or adjusted as desired. Note also that the upper spreader tools are prevented from moving upward during operation by use of the hook and the plate. Thus, if pressure from the moving coil exerts upward force on the upper spreader tools, hook 106 and plate 103 tend to prevent upward movement. This helps to maintain pressure on the coilstock and on the tools, ensuring that the coil has the desired shape when it emerges from the spreader assembly and enters driving rolls 112.

A cross-sectional end-view of the left portion of the spreader tooling is depicted in FIG. 15. Spreader assembly base 115 may be bolted to base 108 via bolts inserted into counter sunk holes 118*a*, 118*b*. Horizontal adjustments may be made with 117*a*, 117*b*. Lower die 102*a* is secured in place with fasteners 117, 119, which are preferably bolts or rods threaded into holes tapped into spreader assembly base 115. The profile of lower die 102*a* preferably includes additional portions 102*c* and 102*d* for guiding the flange and channel portions, respectively, of the coilstock. The gap 116 between the upper die and the highest portions of the lower die is preferably the thickness of the metal profile, as shown in FIG. 7a.

Turning now to FIGS. 14b and 14c with continued reference to FIG. 14, an alternate embodiment of the spreader assembly that includes spreader 100a. Spreader 100a is placed in line after one or more slitter roller assemblies similar to spreader 100 discussed above. Specifically, as shown in FIG. 14, the coilstock enters spreader 100a after passing through the second slitter assembly 110 and is pulled toward the right by drive assembly 112. Spreader 100a includes a lower guide plate, which may be formed as a single guide plate (not shown), or a series of two lower guide plates 102a, 102b shown in FIG. 14. The lower guide plates are supported on the guide support assembly base 115, which is bolted or similar fastened to base 108, which may be bolted to a spreader base 109 or machine base 10a to fix the spreader assembly with respect to the remainder of the machine. Spreader 100a does not require the upper guide plates (tools) 101a, 101b, the plate 103, or the hook 106 shown in FIGS. 14 and 14a. Accordingly, the processing line 10 that includes spreader 100a includes less parts, which reduces the overall cost, weight, and complexity of the processing line 10.

Spreader 100a includes first and second steering plates 140a, 140b that support a portion of the top surface of coilstock 14 as it moves through the spreader 100a. Each steering plate 140a, 140b is removeably attached to a supporting block 142a, 142b, respectively with fasteners 146. The supporting blocks 142a, 142b are connected with the lower guide plates 102a, 102b (or a single lower guide plate (not shown) with a plurality of alignment bolts 144 that may be tightened and relaxed with handles 145. In other embodiments, supporting blocks 142a, 142b may be removeably connected with the guide supporting assembly base 115 instead of the lower guide plates 102a, 102b.

Steering plates 140a, 140b may be made from bronze, or another material that minimizes friction between the steering plates 140a, 140b and translating coilstock 14. More specifically, steering plates may be made from phosphorous bronze or another suitable bronze alloy. In other embodiments, steering plates 140a, 140b may be constructed from steel that is coated with nickel or another suitable coating to minimize friction and wear on the steering plates 140a, 140b and the coilstock 14. In further embodiments, steering plates 140a, 140b may be constructed from other materials with or without coatings that minimize friction and wear on the steering plates 140a, 140b and the coilstock 14.

Steering plates 140a, and 140b may be oriented substantially perpendicular to each other, as shown in FIG. 14c, or in other embodiments may be arranged differently to constrain coilstock 14 as it moves through the spreader 100a. Specifically, first steering plate 140a may be connected to a top surface of supporting block 142a such that first steering plate 140a is mounted generally parallel to the direction of movement Z (FIG. 14b) of coilstock 14 through spreader 100a. As shown in FIG. 14c, first steering plate 140a is provided such that the lower surface of first steering plate 140a contacts the coilstock 14 above or in the vicinity of the flange portion 14a. A pocket 150a is provided between the lower guide plate 102a and the first supporting block to accept the downwardly extending portion of the flange portion 14a. First steering plate 140a is spaced from lower guide plate 102a (102b) with a clearance that is only slightly thicker than the original thickness of coilstock 14 to allow the flange portion 14a of coilstock 14 to be tightly gripped by spreader 100a.

Second steering plate 140b may be mounted to second supporting block 142b to be generally perpendicular to the direction of movement Z of coilstock 14 through spreader 100a. As shown in FIG. 14c, second steering plate 140b is mounted to the internally facing side of second supporting block 142b, with a portion of second steering plate 140b extending below a central portion 14d of coilstock 14. A bottom edge 141b of second steering plate is oriented to be received within the vertex 14c in channel portion 14b of coilstock 14. Accordingly, as coilstock 14 translates through spreader 100a, bottom edge 141b of second steering plate 140b supports the vertex of the channel portion 14c to retain the channel portion within a pocket 150b between lower guide plate 102a (102b) and second supporting block 142b.

As shown in FIG. 14b, the profile of the lower guide plate 102a (102b) and first and second steering plates 140a, 140b expands along the length of spreader 100a. Accordingly, as this profile expands, the coilstock 14 is placed in horizontal tension (due to the force applied to flange and channel portions 14a, 14b by the first and second steering plates 140a, 140b and the lower guide plate 102a (102b)), which expands the width of coilstock 14 as coilstock moves in direction Z through spreader 100a by stretching the perforations 25, 26, 27 (with additional reference to FIG. 3). The profile of first and second steering plates 140a, 140b and lower guide plate 102a (102b) are designed to gradually widen coilstock 14 to the width used in forming the tubing or piping, to minimize the amount of stress placed on the coilstock 14, while also limiting the length of spreader 100a.

Once the metal has been slit, expanded, and flattened, with a suitable flange on one side and channel on the other side, the coilstock may be fed, preferably immediately, to a machine for forming a lockseam by twisting the coilstock, placing the flange within the channel, thus forming a seam, and forming a seal by applying great mechanical pressure to the seam thus formed. This pressure is preferably applied by both an inside roller and an outside roller acting on both sides of the seam. An example of a machine to take the perforated, expanded metal and form tubing or piping from the metal is also described herein. This described in U.S. Pat. Appl. Publ. 2003/0230127, which is assigned to the assignee of the present application, and which is hereby incorporated by reference in its entirety.

The slit, expanded and formed metal strip 11a passes into a machine for forming piping or tubing from coilstock. Such machines are disclosed in U.S. Pat. Nos. 4,706,481 and 4,924,684. The descriptions of the pipe forming apparatus contained in these patents, as well as the disclosures in their entirety, are hereby incorporated by reference. Other machines may also be used to convert the expanded metal into tubing, including but not limited to those described in U.S. Pat. Nos. 4,706,481; 4,711,110; 5,105,639; 5,193,374; 5,257,521; 5,421,185; and 5,636,541; all of which are hereby incorporated by reference in their entirety.

Figure 16:
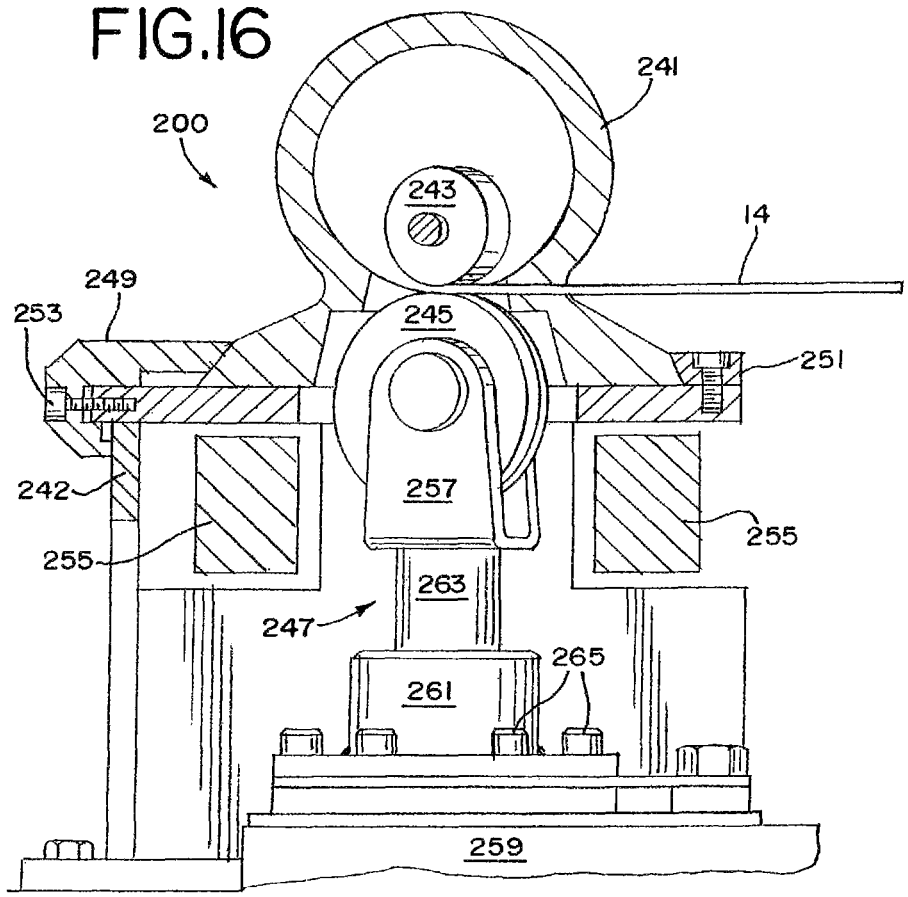
FIG. 16 is a machine for receiving the spread, formed coilstock and converting it to spiral tubing.

One embodiment of a machine for receiving the slit, expanded coilstock 14 and converting it into spiral pipe is depicted in FIG. 16. A pipe forming head or machine 200 for forming spiral pipe includes a forming head 241. The forming head 241 is mounted to the forming head base 242 by clamping bars 249, 251 and bolts 253. In a preferred embodiment, the forming head base is fixed on machine base 242. Rails 255 are used for moving a slitter two cutting knives (not shown) for cutting the formed spiral pipe to the desired length. One knife is ideally mounted on a front end of boom (not shown), the knife and the boom inside the formed pipe. The other knife is mounted outside the boom and the formed pipe. The boom and the knives move with the pipe to cut the pipe while it is moving. With this technique, the forming process does not have to be stopped for cutting the pipe, which now is automatically cut and ejected from the forming machinery.

The forming head 241 curls the metal strip 14 into a cylindrical spiral, whereby the opposing preformed edges of the strip 14 mesh. The meshed edges are then compressed between a support roller 243 and a clinching roller 245 to form a lockseam. The metal strip, as described above is continuously pushed by the drive rollers described above so that a hollow, perforated and expanded cylindrical metal pipe is continuously produced with a spiral lockseam. The clinching roller 245 is moved into and out of its clinching position by a conventional hydraulic cylinder assembly 247. The hydraulic cylinder assembly 247 includes a yoke 257 which holds the clinching roller 245. The yoke is appended to a piston rod 263 which slides in and out of cylinder head 261. The cylinder head 261 is attached to the cylinder barrel 259 by bolts 265. The hydraulic cylinder assembly 247 provides the pressure on clinching roller 245 to close the lockseam on the filter pipe. Knives (not shown) then cut the pipe into desired lengths.

Figure 17:
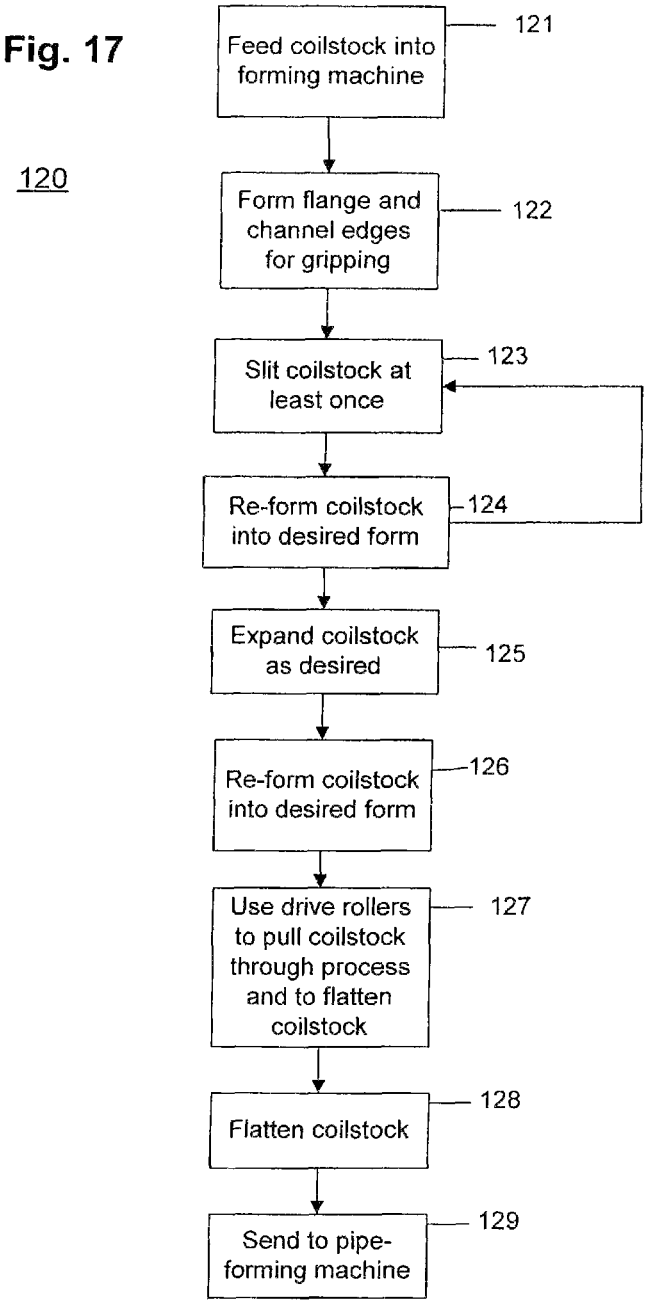
FIGS. 17-18 depict processes for forming slit, expanded coilstock and for immediately taking the formed coilstock and manufacturing tubing and cutting the tubing into desired lengths.
Figure 18:
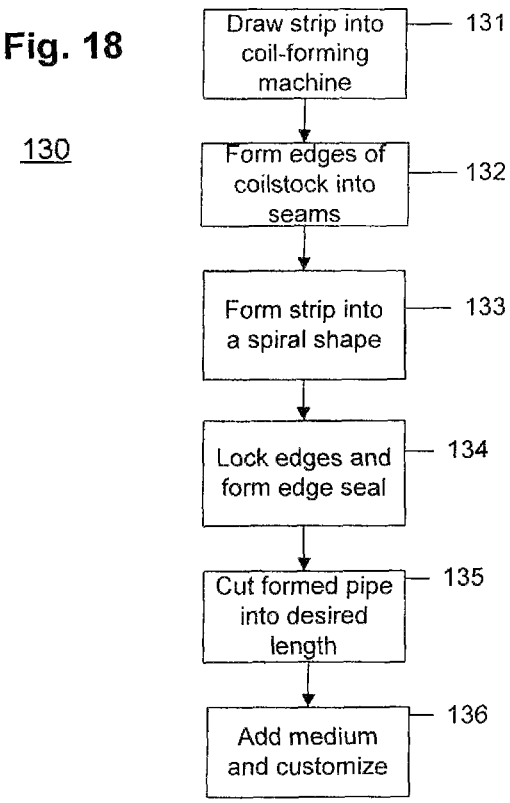

Flow diagrams describing these processes are depicted in FIGS. 17-18. FIG. 17 illustrates a process 120 for forming expanded coilstock and using the coilstock immediately for forming piping. Coilstock is fed 121 from an unwinder into a machine for slitting and expanding preferably metallic (steel or aluminum) coilstock. A form roll unit or similar forming machine forms flange and channel edges 122 on opposite sides of the coilstock so that the machinery downstream can grip the coilstock. The coilstock is then fed into one or more cutter stations, where rotary "knives" or "punch and die" rotary tools place slits 123 into the metal. After the slitting operation, the coilstock may be re-formed 124 or "guided" into a desired shape for subsequent processes. If there is a second slitting operation, the second set of cuts is preferably centered on the first set of cuts, so that coilstock will be symmetrical when it is expanded 125 in a later step.

After expansion, the metal may require another reforming or guiding step 126. The coilstock or web is then passed through drive rollers 127 which pull the coilstock through the process and flatten 128 the coilstock as it passes through. The formed, slit, and expanded coilstock then travels immediately to the next step of the process, a machine 129 which forms the coilstock into tubing and cuts the tubing into desired lengths. Thus, coilstock passes through several steps in which it is formed into expanded metal, and the formed metal then passes immediately into a pipe-forming machine where the formed coilstock is immediately made into seamed tubing of a desired length.

FIG. 18 is a flowchart for the second portion of the process, wherein the expanded coilstock is formed into spiral shaped pipe and then cut into desired lengths. The coilstock is pushed or drawn into the coil-forming machine 131, where the edges are joined into a seam 132. The coil-stock is formed into a spiral shape 133 and the edges are locked and formed into an edge seal 134. An oscillating knife or two knives then cut the pipe into desired lengths 135. Further details may be in U.S. Pat. Appl. Publ. 2003-0230127A1.

Figure 19:
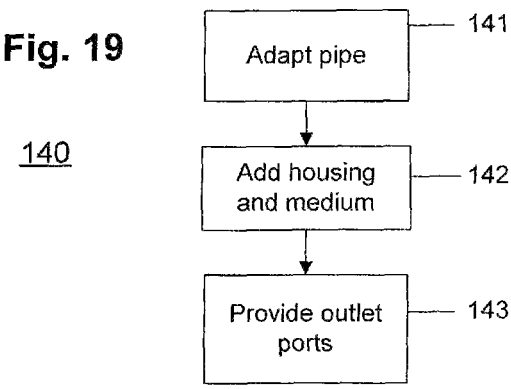
FIG. 19 depicts a process for using the cut tubing for customer applications.
Figure 20:
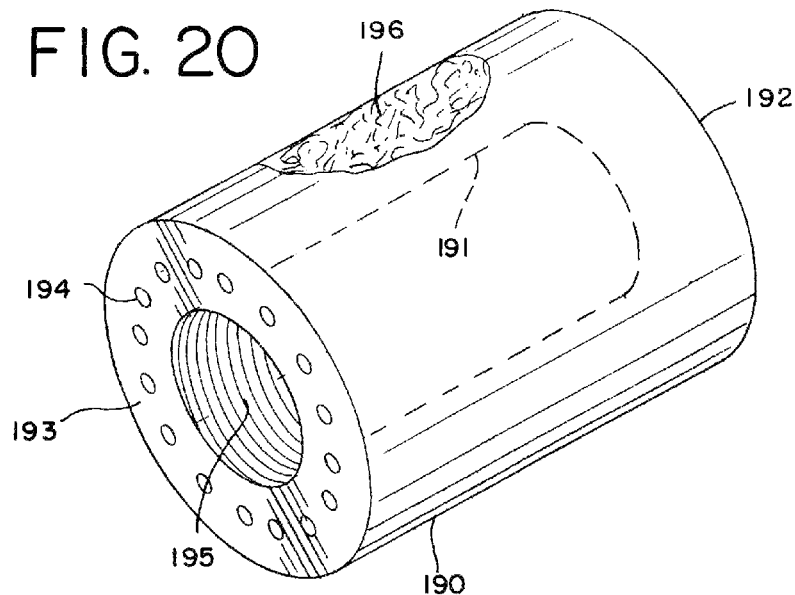
FIG. 20 depicts a filter made from a piece of tubing made by the apparatus described below.

Once the pipe has been cut to length, it may be used for a variety of filters, or even as a noise filter or silencer. As shown in flowchart FIG. 19, the pipe, having been cut to length, may now be adapted 141 for a particular purpose, such as for an oil, water, air, or noise filter. It may be adapted by placing circumferential grooves or other features for mounting a housing 142 around the tube and adding a filter medium inside the housing and around the center filter pipe. The medium may be fiber glass, cotton, or other suitable medium for filtering out the desired undesirable particles or contaminant. There is usually also provided an outlet 143 with a series of orifices or holes, so that the oil, water or air that is being filtered can leave the filter. Thus, particles may be removed from oil, air or water. In addition, noise may be reduced from air through the use of the appropriate medium or media to dissipate sound. An example of a filter, such as an oil filter, made from pipe according to the above apparatus and process is depicted in FIG. 20. Filter 190 is made from a piece of tubing 191 from the apparatus and process described above. Tubing 191 is adapted according to the process of FIG. 20 by having threads 195 machined into the inner portion of the pipe. Filter 190 also includes a cylindrical housing 192, the housing including end portion 193 with orifices 194 so that the oil or other fluid being filtered can exit filter 190. The filter may also include medium 196, such as cotton, fiber glass, or other filter medium or media on the inside of the filter.

Figure 21:
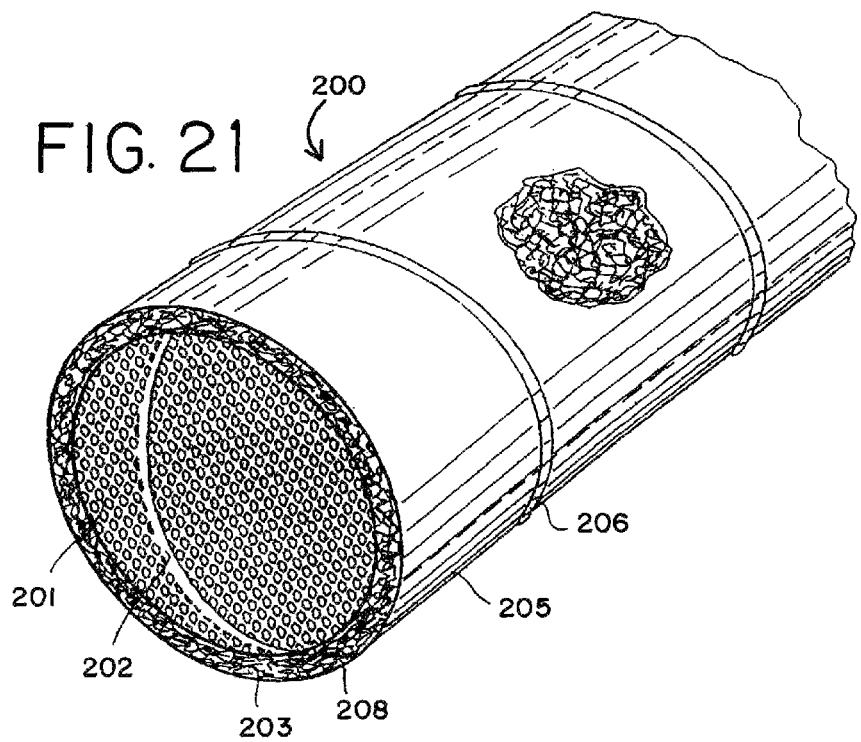
FIG. 21 depicts HVAC tubing made from the apparatus described below.

As mentioned above, tubing made by the above-described process may be used in HVAC piping to absorb sound. Just as an air or oil filter can have two sides, double-wall ventilation duct work 200 can also have two sides. As shown in FIG. 21, double-wall ventilation may have an inner side 201 formed from expanded metal and joined by lock seams 202, and an outer side 205 with spiral locked seams 206 which is also formed from by a spiral seam lock process, but which in this instance is solid, not expanded. Just as air or oil filters use a medium, duct work 200 may also have a medium 203 between inner and outer sides 201, 205. Medium 203 may be mineral wool or other desirable sound-absorbing material, and may also reduce heat loss from air traveling the length of the duct work. By mineral wool is meant synthetic vitreous fibers (SVFs), commonly known as rock or slag wool, typically based on amorphous silicates. Other sound-absorbing materials or insulators may be used, such as prefabricated or loose ceramic insulation or blankets of fiberglass or other suitable material. The insulated/sound-absorbing portion of the duct work may include all the duct work or only selected portions to reduce noise as desired.

Duct work 200 may be made by first forming the inner side 201 using the expanded metal and spiral lock seam process described above. Medium 203 may then be wrapped around the outside of inner side 201. A cover made from outer side 205 may then be assembled around the medium. Outer cover 205 may be made from spiral wrapped tubing or piping, with seams 206. However, outer cover 205 may also be solid plastic or sheet metal tubing or piping, with no seams, assembled over insulation 203 and inner side 201. Outer edges 208 may be butted against one another, may be left unsealed, or may be sealed as desired for better performance.

It will be recognized by those having skill in the art that not all the steps of the process must be accomplished in the order described here. For instance, the coilstock may be slit, expanded, and reformed in a flat manner, without forming the edges into shapes of a channel and a flange. The flange and channel, for instance, may be formed in the pipe-forming machine, as also described in U.S. Pat. Appl. Publ. 20030230127, which is assigned to the assignee of the present invention, and which is hereby incorporated by reference in its entirety. However, the Applicant has found that it is preferred to form the channel and flange portion in order to facilitate the process described above for slitting and perforating coilstock.

Turning now to FIGS. 28-33, another processing line 500 is provided. The processing line 500 produces cylindrical and hollow tubing from expanded coilstock 14. In some embodiments, the line 500 is configured to receive and expand coilstock 14 with a thickness between about 0.016 inches and 0.024 inches, inclusive of specific thicknesses therebetween. As can be understood, the components of the processing line 500 discussed herein can be similarly implemented to receive and process coilstock 14 with differing thicknesses. In one embodiment, the processing line 500 is configured to receive coilstock that is about 67 mm in width and expand the coilstock to about 137 mm. Of course, the processing line 500 discussed herein can be adapted to process other sizes and thickness of coilstock as understood by those of ordinary skill in the art after consulting this specification and appended figures.

The processing line 500 includes several of the components discussed and depicted with respect to the processing line 10, and similar components used in processing line 500 will be noted with the same element numbers as provided with the discussion and depiction of processing line 10, above. Further for like components discussed herein as discussed in previous or later embodiments, components not specifically described herein are configured as discussed in this other embodiments, with the discussion thereof not repeated here for the sake of brevity.

Figure 22:
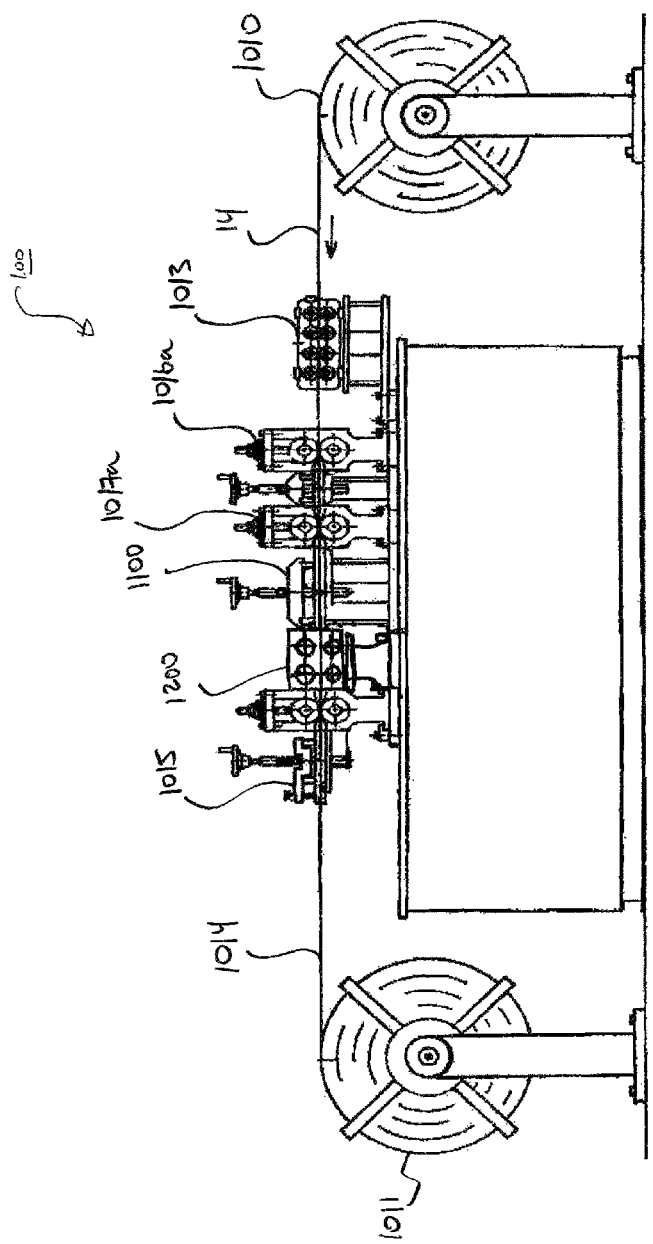
FIG. 22 is an elevation view of another embodiment of an expander.

The processing line 500 receives a continuous length of thin and elongate coilstock 14, which is preferably fed from an unwinder (see FIG. 22, 1010). The unwound, flat, and elongate coilstock 14 may be initially fed through a lubrication system 520 and then received between opposing wheels of the first cutter 530, which forms a plurality of sets of rows of spaced elongate first slots or perforations 21 therein. The coilstock then travels through a second cutter 540 that forms a plurality of sets of rows of spaced slots or perforations 22 that are disposed between the plurality of rows of first slots 21.

The slotted coilstock 14 then is fed into the form roll unit 560, which prepares the opposing right and left edge portions 14b, 14c of the coilstock to a channel 27b (FIG. 4c) and a flange 27a, respectively, to enable the seams of the cylinder to be formed by mating the edge portions 14b, 14c in the pipe forming head 700. After the form roll unit 560 bends the right and left edge portions 14g, 14h of the coilstock 14 to the desired geometry, the coilstock 14 enters the spreader 600, which gradually widens the coilstock 14 by placing increasing horizontal tension on the coilstock 14 (i.e. in the direction perpendicular to the direction of coilstock 14 motion through the spreader 600).

The spreader 600 receives and supports opposite right and left edge portions 14b, 14c of the coilstock and the width of the central portion of the spreader 600 (i.e. the lower base plate 102a, FIG. 14c) gradually increases along the length of the spreader 600. As the width increases, the central portion 14f of the coilstock is placed in horizontal tension of the coilstock 14. With increasing tension, the central portion of the coilstock plastically deforms as the perforations are expanded to define apertures 30 to relieve the stress placed on the coilstock 14. With additional tension placed upon the coilstock 14, the apertures become larger as the coilstock 14 continues along the length of the spreader 600, as best shown in FIG. 3. Eventually, the central portion is stretched such that the apertures 30 are defined by thin strips of metal, and the apertures form shapes similar to diamonds.

The elongated coilstock passes from the spreader 600 to the drive rollers 650, which pull the coilstock through the spreader 600, and flatten the expanded central portion of the coilstock 14 to a relatively flat profile suitable for cylinder formation. The flattened coilstock 14 then passes to the pipe forming head 700 (similar to forming heads 20, 200 discussed above), where the coilstock 14 is urged into a helical geometry, and neighboring channel 27b and flanges 27a are mated to form the helical seam of the cylindrical coiled material. The cylindrical coil is then cut to length with a cutter that cyclically translates in the same direction and speed as the cylindrical coil to cut the cylindrical pipe to the desired length.

The first and second cutter stations 530, 540 include many of the same components as the first and second cutter stations 16a, 17a, discussed above and shown in FIGS. 6a, 6b, and 7. The first cutter station 530 includes a first die 532 and a second die 536 that are maintained in a meshed condition and are rotated in opposite directions about their respective rotational axes (e.g. 542c in FIG. 29). The second cutter station includes a first die 542 and a second die 546 that are each maintained in a meshed condition and are rotated in opposite directions. In some embodiments (as shown in FIGS. 28-31a and 33) the first dies 532, 542 are disposed below the second dies 536, 546. In other embodiments, the first and second dies may be disposed in the opposite (or another suitable) orientation.

Each of the opposed dies of the first and second cutter stations 530, 540 are mechanically connected to a motor that provides torque to control the entire processing line 500 through a transmission. Several suitable methods of transmitting torque from the motor to the rotating dies are discussed elsewhere in this disclosure and will not be repeated herein for the sake of brevity. One of ordinary skill in the art after reviewing this specification will understand the methods to transmit torque to the first and second cutting stations 530, 540, while precisely timing the position of the opposed first and second dies in each cutter station, as well as the first and second cutter stations with respect to each other, such that the first and second cutter stations 530, 540 reliably and repeatedly produce a perforated coilstock that includes slots like those shown schematically in FIGS. 3, 7B, and 26.

The first and second dies 532, 536 and 542, 546 each include a central toothed portion 533, 537 (FIGS. 31-31a, central portions of dies 542, 546 include similar central portions) that is formed similarly to the rotary die 50 discussed above and shown in FIG. 7. The central portions 533, 537 of each of the first and second rotary dies 532, 536 of the first cutter station 530, and the central portions of the first and second rotary dies 542, 546 of the second cutter station 540 each include a plurality of sets of teeth, or lands and a plurality of recesses that are disposed between neighboring sets of teeth. Neighboring teeth disposed in the same set are separated by reliefs or cutouts. The teeth from each set each radially extend outward from the body of the wheel and may include an arcuate profile (See FIG. 7).

The central portion 533, 543 of both first dies 532, 542 is similar to that shown in FIG. 6a and may include seven sets of teeth 46 and six recesses 47 that separate the seven sets of teeth 46. Each set includes a plurality of teeth 46 that radially extend from the body of the central portion 533, 543 that are each the same size and include reliefs 46a between each tooth 46. The central portion 537 (central portion of the second die 546 is similar to 537) of both second dies 536, 546 is similar to that shown in FIG. 6b and may include six sets of teeth 51 and seven recesses 52 that separate the six sets of teeth 51 (inclusive of recesses 52 disposed outboard of the outer most sets of teeth 51). Each set of teeth includes a plurality of teeth 51 extend from and are disposed upon the central portion similar to the teeth shown in FIG. 7 and a relief 51a is provided between each tooth 51 disposed in the same set.

Figure 31A:
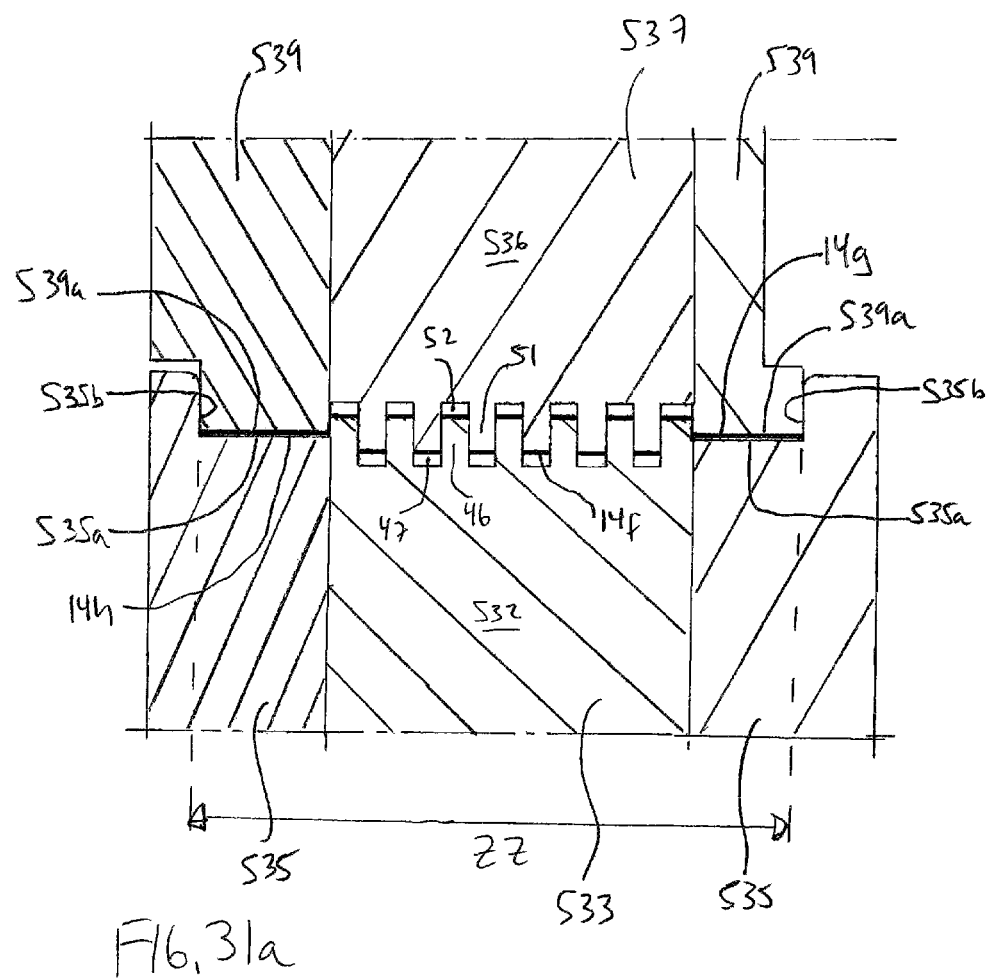
FIG. 31a is a view of detail A of FIG. 31.

As shown in FIG. 31a, the teeth 46 of the first die 532 are received within recesses 52 of the second die 536 and the teeth 51 of the second die are received within recesses 47 of the first die 532. In some embodiments, the respective sets of teeth 46, 51 and the recesses 47, 52 are each sized such that the teeth 46, 51 extend within the recesses 47, 52 with only a small space therebetween. In some embodiments, the teeth 46, 51 are centered within the recesses 52, 47 of the opposing die, and the teeth and recesses are sized such that there is about a 0.002 inches between each side of the teeth 46, 51 and the side of the respective recess 52, 47 surrounding the tooth 46, 51.

FIG. 8 is a side view showing the engagement of upper and lower dies, which are formed similarly to central portions of the opposed dies 532, 536 and 542, 546. As shown in this figure (as well as in FIGS. 6A and 6B), the spaces 47, 51 (shown as 65 in FIG. 8) coincide between the first and second dies 532, 536 and 542, 546, such that a space 57 between the perforations in the coilstock is defined by the absence of the teeth (see FIG. 7B). A top view of the coilstock 14 leaving the second cutter 540 is shown in FIG. 7B, which depicts the slots defined by the first and second cutters as 54b, 55b positioned upon the coilstock 14, as well as the gaps between slots formed along the same line in the coilstock 14.

Each of the first and second dies 532, 536 each additionally include positioning rings 535, 539 on opposing sides of each die 532, 536. The positioning rings 535, 539 each include a transfer portion 535a, 539a that makes close contact with the opposing edge portions 14g, 14h of the coilstock 14. The close proximity between the opposing transfer portions 535a, 539a causes the opposed transfer portions 535a, 539a to engage the edge portions of the coilstock 14 to urge the coilstock 14 therethrough as the first and second dies 532, 536 rotate about their respective axes. One of the first and second dies 532, 536 (specifically the second die 536 in the embodiment depicted in FIG. 31) additionally includes an alignment wall 535b on each of the positioning rings 535. The opposing alignment walls 535b are each spaced at a distance ZZ form the opposite alignment wall 535b, with the distance ZZ defined to be only on the order of about 0.002 inches greater than the width of the coilstock 14 fed into the first cutter station 530. The close proximity of the opposing alignment walls 535b to the opposing outer edge surfaces of the coilstock 14 (FIG. 31) maintain the coilstock properly positioned within the first and second cutters 530, 540 to properly place the perforations upon the coilstock 14. The radius of the alignment walls 535b is greater than the radius of the engagement portion 535a such that the outer edge of the coilstock 14 contacts, or is closely proximate to, at predetermined length XX length of the coilstock 14 as it moves through each of the first and second cutters 530, 540 (as shown schematically in FIG. 33). In some embodiments, the predetermined length XX may be about 2.0 inches, while in other embodiments, the predetermined length XX may be more or less depending on the relative sizes of the coilstock 14 and the components of the form roll unit 560 and the remaining members of the line 500.

The second cutter 540 is configured similarly to the first cutter 530, and includes opposing dies 542, 546 that rotate in opposite directions to urge the coilstock therethrough and create a plurality of rows of slots or perforations between the rows of perforations formed by the first cutter 530. In some embodiments, the first die 542 includes six sets of teeth and seven recesses between the sets of teeth (with the teeth configured similarly to teeth 51 in FIG. 31 and the recesses configured similarly to recesses 52 in FIG. 31) and the second die 546 includes seven sets of teeth and six recesses separating the five sets of teeth (with the teeth configured similarly to teeth 46 in FIG. 31 and the recesses configured similarly to recesses 47 in FIG. 31), with the outer two recesses positioned outboard of the outermost sets of teeth. As with the first cutter 530, the sets of teeth of the first die 542 extend into the recesses of the second die 546, and the sets of teeth of the second die 564 extend into the recesses of the first die 542.

The teeth and recesses of the first and second dies 542, 546 are positioned so that the sets of aligned perforations formed on the central portion 14f of the coilstock are disposed between neighboring sets of perforations formed by the first cutter 530. Further the dies of the first cutter 530 and the second cutter 540 are timed such that that a space (i.e. element 57 of FIG. 7B) between consecutive perforations in the same set of first perforations coincides at substantially the same horizontal position as the center point of the slots formed by the second cutter 540. In other embodiments, the sets of perforations defined by the first and second cutters 530, 540 may be aligned differently with respect to each other to allow the desired geometrical formation of apertures to be defined from the perforations as the coilstock 14 extends through the spreader 600.

Figure 29:
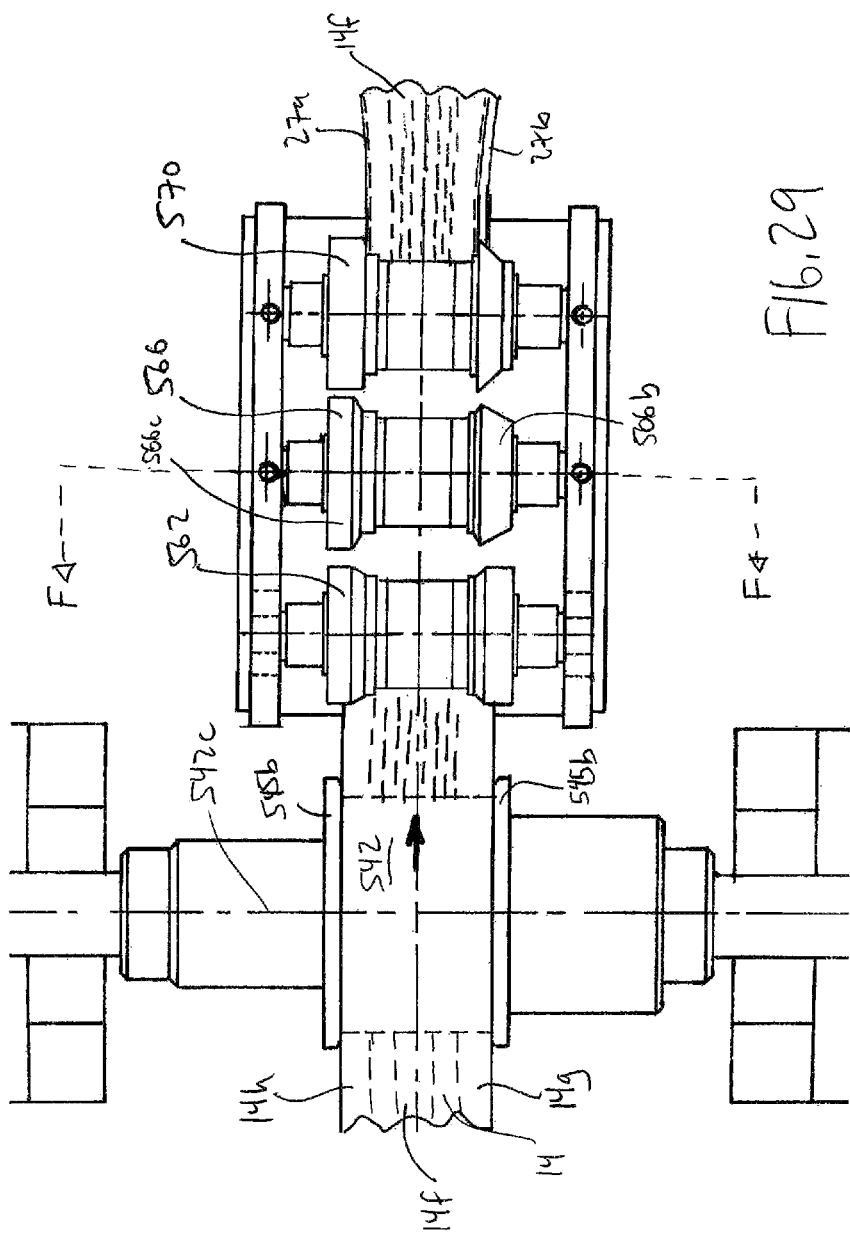
FIG. 29 is a top view a portion of the processing line of FIG. 28, showing the second cutter and the form roll unit.

Each of the first and second dies 542, 546 include positioning rings (similar to positioning rings 535, 539 of the first cutter 530) that include opposing engagement portions and one of the dies includes opposing alignment walls (545b in FIG. 29). The engagement portions and alignment walls are constructed similarly to the same features in the first cutter 530 discussed above and depicted in FIG. 31

Figure 32:
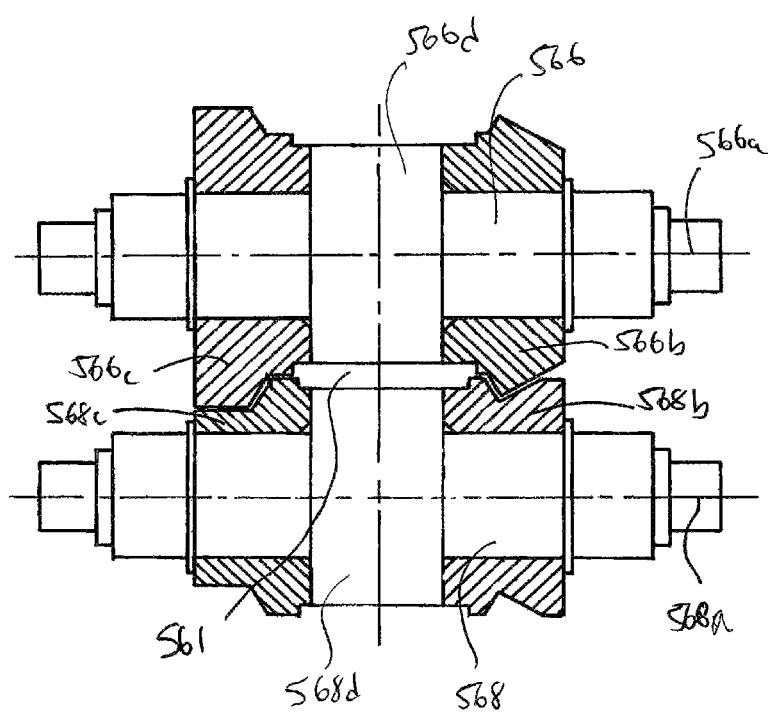
FIG. 32 is a cross-sectional view about section F-F of FIG. 29.

The form roll unit 560 is best shown in FIGS. 28, 30, and 32 and includes a plurality of sets of opposed rollers that are disposed in series. Each of the sets of rollers may be idle rollers, and rotate due to the coilstock being pushed and pulled therethrough due to the torque of the rotating first and second cutters 530, 540 and the drive rollers 650. In some embodiments, as shown in FIG. 28, the form roll unit 560 may additionally include a set of prerollers 560e that idly spin to maintain alignment of the coilstock through the form roll unit 560, but do not operate to form the end portions of the coilstock 14. The prerollers provide a transition between the second cutter 540 (and guide plates 550 when provided) and the form roll unit 560 to minimize the stress imparted to the coilstock 14 as the end formations are formed by the downstream multiple sets of rollers. Because edge portions of the coilstock fits within the sets of rollers with a tight clearance, the friction between the coilstock and the rollers prevents slippage therebetween and causes the rollers to spin with the translating coilstock 14.

The form roll unit 560 is fixed to the base 502 of the line 500 (or potentially fixed to one or more intermediate bases 560a that are fixed to the base 502) and is configured to receive the slotted coilstock 14 leaving the second cutter 540 (and guide system 550, when provided). The form roll unit 560 is configured to establish the bent features on the opposite end portions of the coil stock 14. In some embodiments (FIG. 32) the form roll unit is configured to establish a channel 27b (FIG. 4c) on one end portion 14g of the coilstock 14, and produce a flange 27a (FIG. 4c) on the opposite end portion 14h of the coilstock 14. In other embodiments, the form roll unit 560 can form different end profiles as desired. As discussed herein, when the expanded coilstock 14 is processed by the pipe former 700, the flange 27a is inserted into the channel 27b of the edge of the neighboring coilstock portion, and the flange 27a and channel 27b are deformed to form a locked seam, which establishes and maintains the cylindrical profile of the finished expanded coilstock.

In some embodiments, the form roll unit 560 includes a first set of opposed rollers 562, 564, a second set of opposed rollers 566, 568, and a third set of opposed rollers 570, 572 each disposed in series. Each of the sets of opposed rollers includes an enlarged central portion 561 that is configured to receive and provide space for the widened central portion of the coilstock 14, which includes a plurality of peaks and valleys (see e.g. elements 54a, 55a of FIG. 7a) that are formed when the slots or perforations are disposed upon the coilstock by the first and second cutters 530, 540. As best shown in FIG.

32, which is a sectional view of the second set of opposed rollers 566, 568 (with the first and third sets of rollers of the form roll unit 560 being similarly formed), the first and second opposed rollers 566, 568 include right end portions 566b, 568b and left end portions 566c, 568c that are configured to bend the right and left end portions 14g, 14h of the coilstock 14 to define the channel 27b and the flange 27a, respectively (or other orientations as appropriate for other embodiments). The right and left end portions 566b, 568b and 566c, 568c each include a geometrical profile around the circumference of each portion to define the desired feature on the selected end of the coilstock. For example, as shown in FIG. 32, the right end portions 566b, 568b of the first and second roller 566, 568 each include features to define two connected oblique angles into the right end portion of the coilstock 14 to ultimately configure the end portion 14g into the channel 27b. As can be appreciated, the form roll unit 560 includes three sets of rollers disposed in series, such that the final flange 27a and channel 27b formed in the coilstock 14 leaving the form roll unit 560 is formed gradually in stages within the form roll unit 560. The gradual formation of the features on the end portions of the coilstock 14 minimizes the stress introduced into the coilstock 14, which prevents fracture or weakening of the coilstock during the forming process.

In other embodiments, the form roll unit 560 may be configured to dispose flanges in both opposite end portions of the coilstock 14 translating therethrough. In this embodiment, the plurality of sets of rollers of the form roll unit 560 are configured to gradually plastically deform the coilstock 14 to include opposed flange portions. With reference to FIG. 32, the right ends 566b, 568b of the opposed rollers 566, 568 are also arranged like the left end portions 566c, 568c. One of skill in the art will appreciate that the plurality of sets of rollers are configured to gradually define the flanges on opposing end portions of the coilstock 14, with the second set of rollers 566, 568 being observable to understand how the first and third sets of rollers (when provided) would also be configured to establish flanges on opposing end portions of the coilstock 14.

In some embodiments shown in FIG. 30, at least the second and third sets 566, 568 and 570, 572 of rollers are configured to be adjustable to modify the space between the opposed end portions of the rollers, to allow for different thickness of coilstock to be processed by the form roll unit 560, and the line 500. In some embodiments, the upper roller 566, 570 may be adjusted toward or away from the base 502 (and therefore the opposed roller 568, 572) with a linear adjustment mechanism 566e, 570e to alter the space between the two rollers, i.e. the upper roller 566 (or 570) may be adjusted such that the rotational axis 566a of the upper roller 566 may be translated toward or away from the rotational axis 568a of the lower roller (FIG. 32). Similarly, in other embodiments, the position of the lower roller 568 (570) may be adjusted to alter the distance between the rotational axes 566a, 568a. It has been empirically found that the first set 562, 564 of rollers may be operated with the opposed portion at a distance suitable to receive many thicknesses of coilstock 14 (i.e. through the entire range of thicknesses of coilstock 14 that the remainder of the line is designed to process) such that the first set of rollers need not be adjustable. Of course, one of skill in the art will appreciate that it is possible to provide the first set 562, 564 of rollers with structure to adjust the distance between the first and second rollers 562, 564 if desired or warranted.

Each of the sets of opposed rollers of the form roll unit 560 may be disposed upon the base 502 (and potentially with an intermediate base 560a) to fix the position of the opposed rollers upon the base to prevent movement or adjustment of the position in a direction parallel to the direction of coilstock 14 motion therethrough. In some embodiments, each of the sets of rollers may be disposed upon the base 502 (or intermediate base 560a) such that the position of the sets of rollers (either independently or as a unit) may be adjusted in a direction perpendicular to the direction of coilstock motion through the form roll unit 560. In some embodiments, the base 502 (or intermediate base 560a) may include one or more keyways 503 that receive a keyed projection 503a from one or both of the opposed rollers (or the housing the form roll unit 560). The keyed connection allows adjustment (in a direction into or out of the page of FIG. 30), but maintain the sets of rollers otherwise fixed. In some embodiments, the keyway 503 and key 503a may each be ¼ inches, while in other embodiments they may be other dimensions as appropriate. This adjustability is provided in the event that the first and/or second cutters 530, 540 become misaligned during use.

Figure 23:
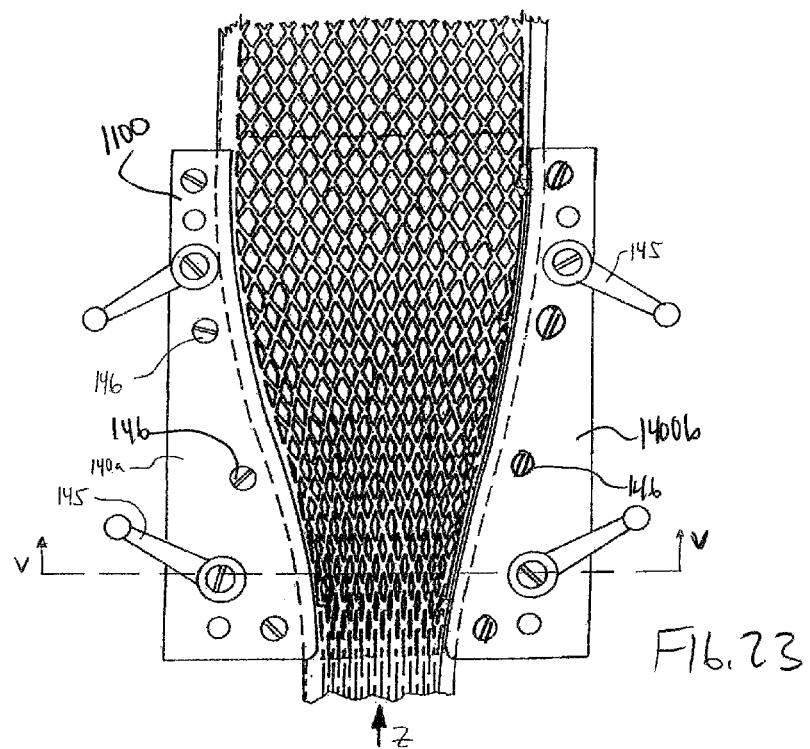
FIG. 23 is a top view of the spreader of the expander of FIG. 22.

The spreader 600 is disposed to receive the coilstock 14 with a flange 27a and channel 27b (or other features formed as desired) formed therein and gradually place horizontal tension upon the central portion 14f of the coilstock 14 to plastically expand the central portion 14f. FIGS. 3, 14, and 23 provide schematic views of the coilstock 14 being gradually expanded by the spreader 600. The cross-sectional arrangement of a suitable spreader 600 is shown in FIG. 14c and includes a lower guide plate 102a that supports the coilstock and first and second steering plates 140a, 140b which receive and support the flange 27a and channel 28b, respectively. In some embodiments, the first and second steering plates 140a, 140b may be disposed substantially perpendicularly, with the first steering plate 140a enclosing the flange portion (in combination with the lower guide plate 102a), and the second steering plate 140b extends within the concave bent portion of the channel 27b to support the channel portion in combination with the lower guide plate 102a. As understood with combined reference to FIGS. 14b and 14c, the lower guide plate 102a and the first and second steering plates 140a, 140b are suitably curved to place horizontal tension upon the central portion 14f of the coilstock 14 as the coilstock is pulled through the spreader 600 by the drive rollers 650. The engagement between the first and second steering plates 140a, 140b and the respective flange or channel 27a, 27b prevent slippage and therefore localizes the stress within the central portion of the coilstock 14, which causes the central portion 14f to expand at the perforations disposed in the coilstock 14.

Figure 24:
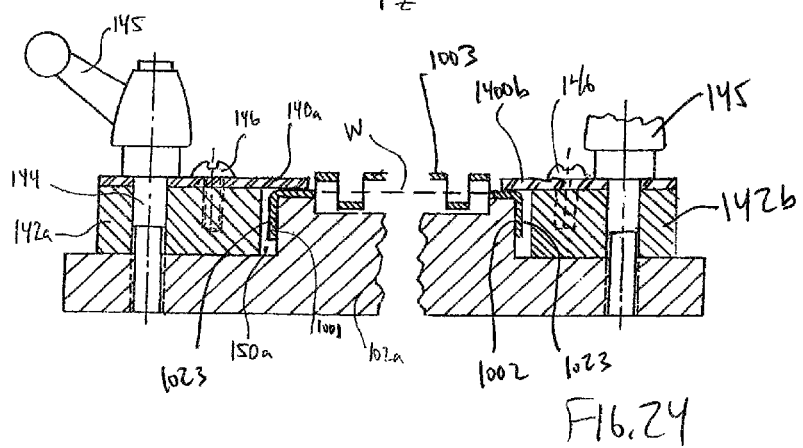
FIG. 24 is a partial cross-sectional view of the alternate spreader of FIG. 23 about line V-V.

In embodiments where the form roll unit 560 establishes flanges on both end portions of the coilstock, the spreader 600 may be arranged as depicted in FIGS. 23 and 24 to receive a coilstock with two flange portions. In this embodiment, the first and second steering plates (140a, 1400b, FIG. 24) are disposed along substantially the same plane, and direct horizontal tension upon the central portion of the coilstock 14 in conjunction with the expanding lower guide plate 102a.

The expanded coilstock 14 then moves to the opposed drive rollers 650, which engage the expanded coilstock to pull the coilstock through the spreader 600 and additionally compress the central portion 14f of the coilstock to a substantially flat profile that is suitable for forming a cylindrical tube in the pipe forming head 700. The opposed drive rollers are disposed at a close proximity (only slightly wider than the width of the maximum thickness of the coilstock 14 to be used in the like (i.e. in some embodiments only slightly wider than 0.024 inches) such that the central portion 14f of the coilstock 14 is compressed to a relatively flat orientation as the coilstock 14 passes through the drive rollers 650. The drive rollers 650 may be mechanically connected to the motor providing torque to the line 500, as discussed elsewhere herein, such that the timing and operation of the drive rollers 650 are consistent with the first and second cutters 530, 540.

In embodiments where both a flange 27a and a channel 27b are defined by the form roll unit 560, the opposed drive rollers 650 are configured to receive and support the flange 27a and the channel 27b such that the coilstock 14 maintains these features as it passes therethrough to allow the cylinder to be formed (with the seam created by a proximate flange 27a and channel 27b) in the pipe forming head 700. In other embodiments, such as the line 1000 discussed below, the form roll unit 560 defines flanges 27a on opposite sides of the coilstock 14, the drive rollers 650 are configured to bend the flanges to an orientation substantially planar with the remainder of the coilstock 14 leaving the drive rollers 650, e.g. to the orientation shown in FIG. 27f. As discussed below, the line 500 may be modified to replace the pipe forming head 700 with a recoiler (1011, FIG. 22) such that spools of expanded substantially planar coilstock may be formed for shipment of the expanded coilstock in a spooled form, rather than cylinders of expanded coilstock.

The line 500 may further include a guide member 550 (FIG. 30), which is disposed to receive the perforated coilstock 14 leaving the second cutter station 540, to support and maintain horizontal alignment in the coilstock prior to entering the form roll unit 560. The guide member 550 may include upper and lower plates 552, 554 that support the upper and lower sides of the coilstock. One of the upper or lower plates 552, 554 may be adjustably mounted upon the base 502 with an adjustment mechanism (such as mechanism 554a of FIG. 30) such that the guide member 550 may be adjustable for differing sized coilstock. The guide member 550 defines a central enlarged portion (similar to portion 561 in FIG. 32) that receives the undulated central portion of the coilstock (as shown in FIG. 7A).

Turning now to FIGS. 22-27f, an alternate processing line 1000 is provided to produce rolls of substantially flat expanded sheet-like material. The processing line 1000 may include a first form roll unit 1013, first and second cutter stations 1016a, 1017a, a spreader 1100, one or more flattening stations 1015, and a second form roll unit 1200. As with the embodiments discussed above, the processing line 1000 receives flat and elongate stock 14 that may be fed from an unwinder 1010. The processing line 1000 forms a continuous length of flat and elongate expanded stock 1014 with a central expanded section 1003 and narrow ribbons of nonexpanded material formed on opposing outer edges 1001, 1002 of the expanded stock 1014. The expanded stock 1014 may then wound onto rolls with a recoiler 1011 to make the elongate expanded stock 1014 suitable for storage and shipment to an end user. The end user may unwind the expanded elongate expanded stock 1014, create seams upon the opposing edges 1001, 1002 and form the stock into cylindrical coils using the coil forming processes and apparatuses discussed above. The processing line 1000 allows for the manufacture of flat and elongate expanded stock 1014 suitable for forming a cylindrical coil, while allowing the end user to form the cylindrical coil structure at the final manufacturing facility rather than transporting the relatively bulky assembled cylindrical coils in situations where the stock is expanded at a different facility from that where the expanded stock is used in a final product.

Figure 27F:
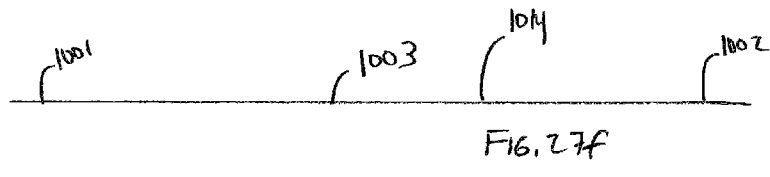
FIG. 27f is a cross-sectional view of the expanded stock after leaving the second form roll unit.
Figure 27E:
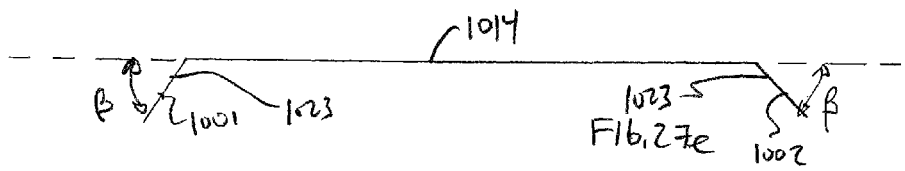
FIG. 27e is a cross-sectional view of the expanded stock after moving through the first set of dies of the second form roll unit.
Figure 27D:
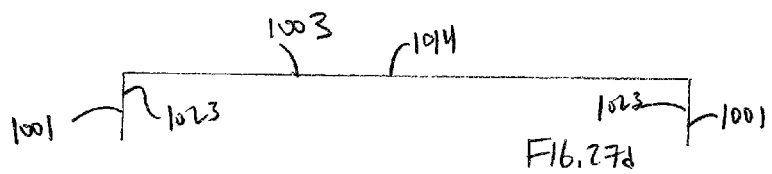
FIG. 27d is a cross-sectional view of the expanded stock after leaving the spreader.

The first form roll unit 1013 may include a first set of rollers 1013a and a second set of rollers 1013b disposed in series and is configured and operates similarly to the form roll unit 13 shown in FIG. 5. The first form roll unit 1013 provides a motive force to pull the stock 14 from the unwinder and to push the stock 14 through the remainder of the machine. The first form roll unit 1013 continuously receives an elongate flat sheet of stock 14 (with a cross-section shown in FIG. 27a) from an unwinder 1010, or another suitable material feed device. The first set of rollers 1013a is configured to form flanges 1023 on each of the opposite edges 1001, 1002 of the flat sheet stock 14. In some embodiments, the first set of rollers 1013a bends the opposite edges 1001, 1002 from a substantially flat orientation shown in FIG. 27a (i.e. each edge 1001, 1002 is disposed along the same plane W as a central portion 1003 of the sheet stock) to an orientation where the opposite edges flanges 1023 are each disposed at an acute angle α with respect to plane W, with each flange 1023 disposed below the plane W, as shown in FIG. 27b. In some embodiments, the angle α may be approximately 45 degrees, while in other embodiments the angle α may be other acute angles.

Figure 27C:
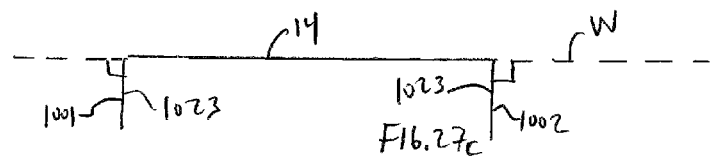
FIG. 27c is a cross-sectional view of the stock after leaving the first form roll until.
Figure 27B:
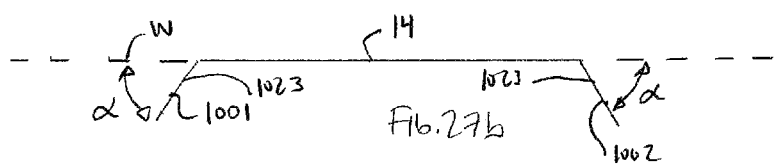
FIG. 27b is a cross-sectional view of the stock after moving through the first set of dies of the first form roll unit.
Figure 27A:
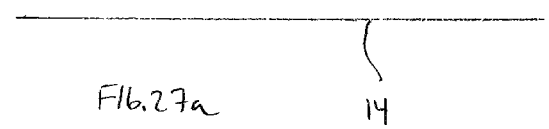
FIG. 27a is a cross-sectional view of the stock processed by the expander of FIG. 22.

A second set of rollers 1013b receives the partially bent stock 14 from the first set of rollers 1013a and further bends each flange 1023 until they are each approximately perpendicular to the plane W, as shown in FIG. 27c. In other embodiments, the first and second sets of rollers 1013a, 1013b may bend each flange 1023 to differing angles with respect to the plane W of the central portion of the sheet. For example, the first set of rollers 1013a may bend each flange 1023 to an initial angle α of about 30 degrees with respect to the plane W and the second set of rollers 1013b may bend each flange 1023 to be approximately perpendicular to the central portion 1003 and the plane W. In other embodiments, a single set of rollers may bend each edge 1001, 1002 to form opposing flanges that are substantially perpendicular to the central portion 1003 and the plane W.

Upon leaving the first and second rollers 1013a, 1013b, the stock 14 moves through the series mounted first and second cutter stations 1016, 1017, which dispose respective first and second sets of slits upon the stock. The first and second cutter stations 1016, 1017 may be designed and operate similarly to the first and second cutter stations 16a, 17a, discussed above. The first and second cutter stations 1016, 1017 form first and second series of slits or perforations 54b, 55b upon the stock, as best shown in FIG. 7b. The stock is then directed to the spreader 1100, which may be configured similarly to the spreader 100a discussed above and shown in FIGS. 14b and 14c, as modified in FIGS. 23 and 24. For the sake of simplicity, element numbers from the structure of spreader 100a will be used for similar structure disposed upon spreader 1100, with differing or altered structure in spreader 1100 provided with unique element numbers.

The spreader 1100 receives the stock 14 with first and second slits 54b, 55b at an inlet end of the spreader 1100. The spreader 1100 includes one or more lower guide plates 102a, 102b that support the stock 14 (or expanded stock 1014) as it extends through the spreader 1100. The spreader 1100 includes first and second retaining plates 140a, 1140b that support a portion of the stock 14, and specifically the flanges 1023 disposed on opposing edges 1001, 1002 of the stock 14 (1014). The first and second retaining plates 140a, 1140b may each be fixedly connected to the lower guide plates 102a, 102b with respective supporting blocks 142a, 142b.

Retaining plates 140a, 1400b may be made from bronze, or another material that minimizes friction between the retaining plates 140a, 1400b and translating stock. More specifically, retaining plates 140a, 1400b may be made from phosphorous bronze or another suitable bronze alloy. In other embodiments, retaining plates 140a, 1400b may be constructed from steel that is coated with nickel or another suitable coating to minimize friction and wear on the steering plates 140a, 1400b and the stock 14 (1014). In further embodiments, retaining plates 140a, 1400b may be constructed from other materials with or without coatings that minimize friction and wear on the retaining plates 140a, 1400b and the stock 14 (1014).

First and second retaining plates 140a, 1400b may be oriented substantially parallel to each other, as shown in FIG. 24. In some embodiments the first and second retaining plates 140a, 1400b may be aligned along the same plane, which is just above the plane W of the central portion 1003 of the stock 14 (1014). The first and second retaining plates 140a, 1400b may be connected to a top surface of the respective steering block 142a, 142b such that the first and second retaining plates 140a, 1400b are each mounted generally parallel to the direction of movement Z (FIG. 23) of the stock through the spreader 1000. As shown in FIGS. 23 and 24, the first and second retaining plates 140a, 1400b are each provided such that the lower surface of each retaining plate contacts the stock 14 (1014) above or in the vicinity of the respective flange 1023. A pocket 150a is provided between the lower guide plates 102a, 102b and the respective supporting block 142a, 142b to accept the downwardly extending portion of the flange 1023. Each retaining plate 140a, 1400b is spaced from the lower guide plate 102a, 102b with clearance that is only slightly larger than the original thickness of the stock 14 to allow the flange 1023 to be tightly gripped by the spreader 1100.

As shown in FIGS. 23 and 24, the profile of the lower guide plates 102a, 102b and the first and second retaining plates 140a, 1400b expands along the length of the spreader 1100. Accordingly, as this profile expands, the central portion 1003 of the stock 14 is placed in horizontal tension (due to the force applied to the respective flanges 1023 by the first and second steering plates 140a, 1400b and the lower guide plate 102a, 102b), which expands the width of the stock 14 as it moves in direction Z through spreader 1100. As the stock moves through the spreader 1100, the central portion 1003 expands as understood when comparing FIG. 27c (i.e. the cross-section of the stock 14 entering the spreader 1100) and FIG. 27d (i.e. the cross-section of the expanded stock 1014, shown with the central portion in a flattened state for the sake of simplicity). Specifically, the stock 14 (1014) is stretched by stretching the perforations 27 (with additional reference to FIG. 3) formed by the first and second sets of slits 21, 22. The profile of first and second steering plates 140a, 1400b and lower guide plate 102a, 102b are designed to gradually widen the stock 14 (1014) to the width used to form the intended tubing or piping, to minimize the amount of stress placed on the stock, while also limiting the length of spreader 1100.

After leaving the spreader 1100, the expanded stock 1014 may be restored to a substantially planar elongated configuration (i.e. the cross-section of FIG. 27d) with a flattening station 15, as shown in FIG. 2 and discussed above. The flattening station 15 may include one or more opposing rollers that are spaced apart a distance only slightly greater than the thickness of the stock 14 prior to flowing through the spreader 1100. The rollers pull the stock through the spreader 1100 and push the stock downstream of the spreader 1100 through the remainder of the machine. In other embodiments, a guide plate assembly 86, shown in FIG. 12a may be provided in series with the flattening station to gradually flatten the expanded stock 1014 after leaving the spreader 1100.

The flanges 1023 on opposing edges 1001, 1002 of the expanded stock 1014 are flattened to be aligned in parallel to and within the same plane W as the expanded central portion 1003 of the expanded stock 1014, as shown in FIG. 27f. After the expanded stock 1014 exits the flattening station 15, the expanded stock 1014 flows through the second form roll unit 1300. The second form roll unit 1300 may include a first set of rollers 1300a and a second set of rollers 1300b disposed in series. The first set of rollers 1300a continuously receives the expanded stock 1014 (with a cross-section as shown in FIG. 27d) and is configured to bend the flanges 1023 on each of the opposite edges 1001, 1002 from their approximate perpendicular orientation to an intermediate acute angle β between the original substantially perpendicular orientation and the final parallel orientation with respect to the central portion 1003, as shown in FIG. 27e.

In some embodiments, the angle β may be approximately 45 degrees or another intermediate angle. The angle β may be the same as or different from the angle α discussed above. The second set of rollers 1300b bends the flanges 1023 from the intermediate angle β to an orientation substantially planar with the central portion 1003 of the expanded stock 1014, as shown in FIG. 27f. Upon leaving the second set of rollers 1300b the expanded stock 1014 may travel to a recoiler mechanism 1011, which wraps the expanded stock 1014 around a rotating spool to provide a roll of expanded stock 1014 material suitable for transport. The recoiler mechanism 1011 may be motorized to ensure that the roll of expanded stock is precisely formed and to remove any slack in the length of the expanded stock 1014 between the second form roll unit and the recoiler.

There are many embodiments of the method used to form coilstock and to make tubing in a continuous process as described above, of which those described above are only a few. For instance, the adjustment mechanisms for many of the operating stations are described as threaded rods or bolts. Each of these may be considered to be a screw mechanism for making fine adjustments. Accordingly, it is intended that the foregoing detailed description be regarded as illustrative rather than limiting, and that it be understood that it is the following claims, including all equivalents, that are intended to define the spirit and scope of this invention.

What is claimed is:

1. An apparatus for continuously perforating coilstock and forming tubing, the apparatus comprising:

first and second cutter stations for receiving and perforating the coilstock, the first and second cutter stations each comprising a tool for perforating coilstock;

a form roll unit that receives the perforated coilstock from the second cutter station, the form roll unit configured to form at least one edge portion of the coilstock into a non horizontal profile; and a spreader for receiving and expanding the perforated coilstock, wherein the spreader comprises first and second fixed steering plates that each interact with the respective first and second edges of the stock to place the central portion of the stock in tension, the spreader further comprising a fixed lower guide plate upon which the central portion of the stock translates.

2. The apparatus of claim 1, wherein the at least one edge portion of the coilstock comprises opposite first and second edges, wherein each of the first and second edges of the coilstock are solid, with no perforation or expansion of metal on the first and second edges before the coilstock is formed into tubing.

3. The apparatus of claim 1, wherein the first and second steering plates are positioned substantially perpendicular to each other.

4. The apparatus of claim 1, further comprising at least one lubrication device configured to receive the coilstock therethrough.

5. The apparatus of claim 1, further comprising a guide station disposed between the second cutter station and the form roll unit, the guide station configured to support the perforated coilstock traveling therethrough.

6. The apparatus of claim 5, wherein the guide station comprises a central enlarged portion to allow the perforated central portion of the coilstock to advance therethrough without deformation thereof.

7. The apparatus of claim 1, further comprising a tubing machine for receiving the expanded, perforated coilstock and forming the coilstock into tubing.

8. The apparatus of claim 1, wherein the lower guide plate with first and second side edges that engage the respective flanges upon the first and second edges of the stock and the first and second side edges of the lower guide plate each form continuous curves along a portion of the spreader such that a width of the central portion increases in a non-linear fashion along the spreader.

\* \* \* \* \*